United States Patent [19]
Shon et al.

[11] Patent Number: 5,634,158
[45] Date of Patent: May 27, 1997

[54] MAGNETICS-ON-FILM, MULTI-TRACK IMAGE AREA INTERLEAVED RECORD/ REPRODUCE SYSTEM

[75] Inventors: Russell D. Shon, San Diego; Wlodzimierz S. Czarnecki, Rancho Santa Fe; Tomasz M. Jagielinski, Carlsbad, all of Calif.

[73] Assignee: Eastman Kodak Company, Rochester, N.Y.

[21] Appl. No.: 661,536

[22] Filed: Jun. 11, 1996

[51] Int. Cl.⁶ .................................................. G03B 17/24
[52] U.S. Cl. .................................... 396/320; 396/311
[58] Field of Search .................................. 396/310, 311, 396/319, 320

[56] References Cited

U.S. PATENT DOCUMENTS

| | | | |
|---|---|---|---|
| 3,769,465 | 10/1973 | Wellbrock | 179/100.2 |
| 4,965,626 | 10/1990 | Robison et al. | 355/40 |
| 4,977,419 | 12/1990 | Wash et al. | 354/76 |
| 5,132,715 | 7/1992 | Taillie | 354/105 |
| 5,187,518 | 2/1993 | Kitagawa | 355/40 |
| 5,204,708 | 4/1993 | Whitfield et al. | 354/105 |
| 5,229,810 | 7/1993 | Cloutier et al. | 355/40 |
| 5,321,452 | 6/1994 | Tsujimoto | 354/106 |
| 5,530,501 | 6/1996 | Bell | 354/106 |
| 5,555,043 | 9/1996 | Brock et al. | 354/106 |

Primary Examiner—Safet Metjahic
Assistant Examiner—John Chizmar
Attorney, Agent, or Firm—William F. Noval

[57] ABSTRACT

Magnetic recording and/or reproducing schemes and systems particularly for use for recording and/or reproducing information in data tracks of a magnetics-on-film (MOF) layer in the image area of a photographic filmstrip in a camera or in other photographic equipment. Recording of a photographic data set related to captured images is effected in n lengthwise extending, total interleaved tracks effected in the alternative by a single one or plural magnetic head array(s) of m magnetic recording heads arranged to extend across the filmstrip width and positioned in the camera alongside the photographic image frame gate. In one embodiment, the photographic data set is prepared in n/m data sub-sets, and a stepping mechanism is provided for stepping the magnetic head array between n/m positions to effect the recording of each data sub-set in the respective sub-set of m interleaved tracks such that the full data set is recorded in a single image frame area or in a single sub-set of m tracks extending for more than one image frame. In a further embodiment, n/m head arrays of m recording heads are fixedly mounted in the camera in a staggered fashion so that the n/m data sub-sets are recorded in the n/m sub-sets of m interleaved tracks. The n/m recording heads may be mounted on one side or on both sides of the photographic image frame gate.

30 Claims, 11 Drawing Sheets

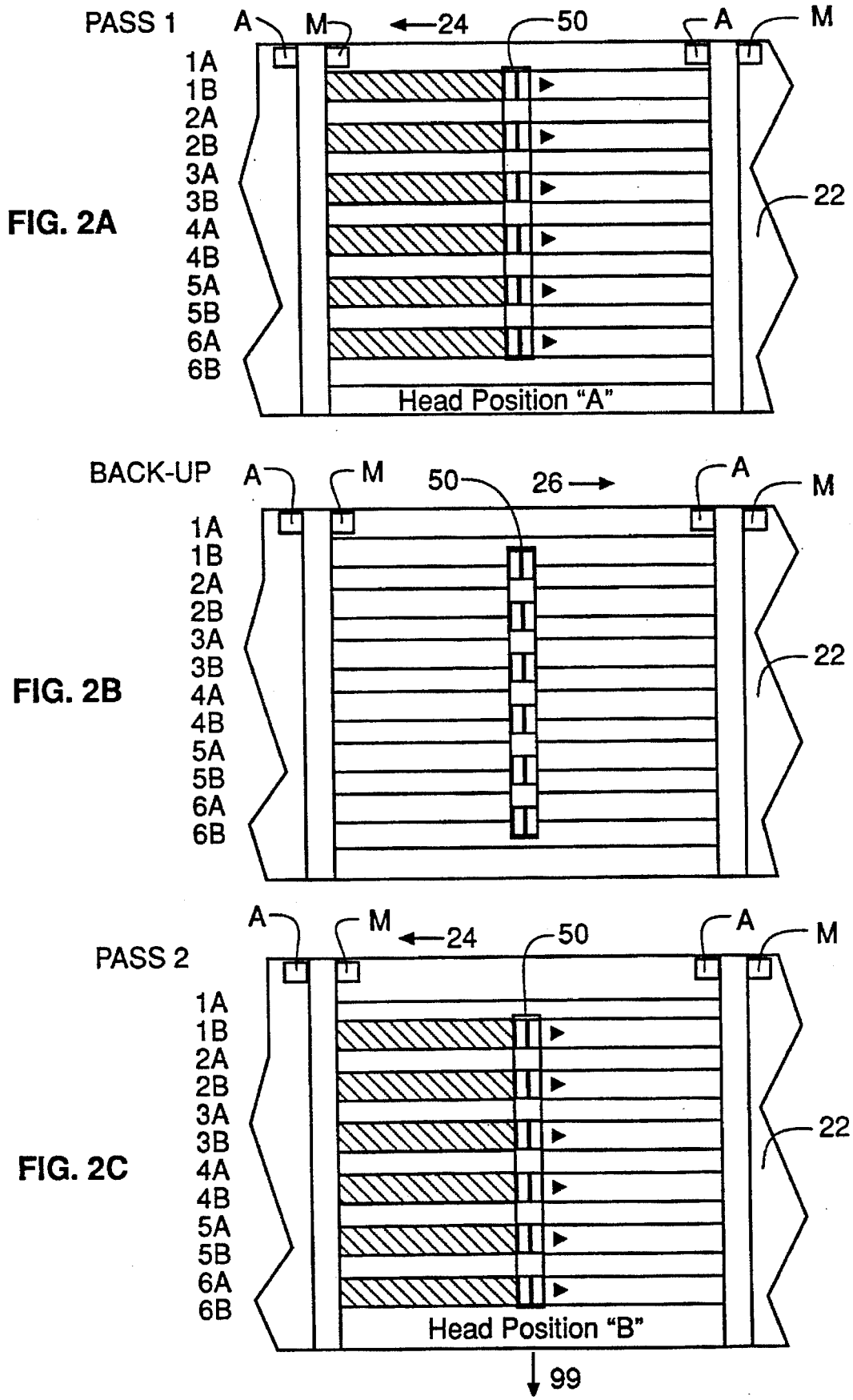

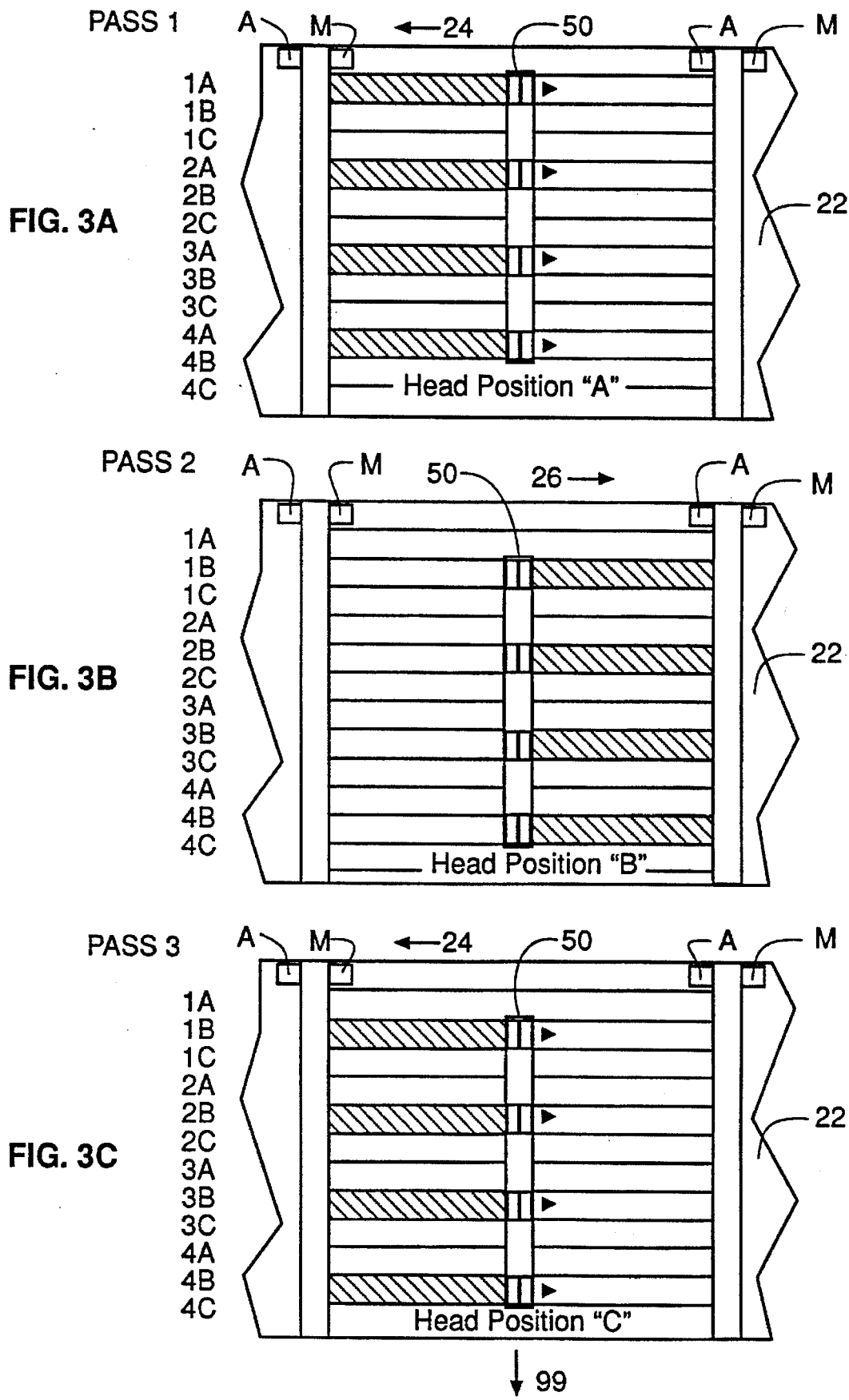

MAGNETICS-ON-FILM, MULTI-TRACK IMAGE AREA INTERLEAVED RECORD/REPRODUCE SYSTEM

CROSS REFERENCE TO RELATED APPLICATION

Reference is made to and priority claimed from U.S. provisional application Ser. No. 60/001,630, filed 28 Jul. 1995, entitled MAGNETICS-ON-FILM, MULTI-TRACK IMAGE AREA INTERLEAVED RECORD/REPRODUCE SYSTEM.

Reference is hereby made to commonly assigned, U.S. Pat. No. 5,450,149 and U.S. Pat. No. 5,502,528.

FIELD OF THE INVENTION

The present invention relates to magnetic recording and/or reproducing head (for simplicity, referred to herein as magnetic heads) systems particularly for use for recording and/or reproducing information on a magnetics-on-film (MOF) layer in the image area of photographic filmstrips.

BACKGROUND OF THE INVENTION

In commonly assigned U.S. Pat. Nos. 4,965,626 and 5,229,810, a photographic filmstrip having a virtually transparent, magnetic film layer on the non-emulsion side of the filmstrip (referred to as an MOF layer) is disclosed for use in camera systems. One or more longitudinal read/write tracks are illustrated in the MOF layer between the side edges of the image frame area and the filmstrip where information such as film type, film speed, film exposure information and information relevant to the processing and subsequent use (e.g., printing) of the exposed image frames is pre-recorded during manufacture of the filmstrip cartridge. The pre-recorded information useful for controlling camera operations may be read out in a camera, and information related to the exposure of an image frame may be recorded in certain other tracks during camera use. The information recorded during camera use may include voice messages or sound associated with the photographed scene and may be recorded in digital or analog format on the certain tracks. It is contemplated that both the pre-recorded and the camera use recorded information will be read out for control and reprint purposes during photofinishing. Also, it is contemplated that the photofinisher may have the capability to record additional information related to finishing, e.g. printing exposure conditions, customer information, reorder information, etc., in further tracks.

Although, the recording of information in the image frame area tracks of the MOF layer has been proposed in the '626 and '810 patents, and elsewhere, camera systems for magnetic reproducing and recording in the MOF layer have largely been devoted to recording and reproducing in the edge tracks and filmstrip leader. The difficulty in providing the high, optimal degree of compliance with the optically transparent, low magnetic particle concentration, MOF layer, without causing optically visible damage to the filmstrip emulsion layers or MOF layer, is perceived as a deterrent.

The MOF layer is optically transparent and is formed of low concentration magnetic particles. The low concentration requires the optimal head gap compliance with the MOF layer and also limits the digital data recording density. The digitized information has to be encoded in bytes as described in the above-referenced '810 and '626 patents. These limitations and requirements in turn limit the amount of information that may be recorded in each track. The number of possible magnetic heads that can be economically fabricated in the head array will also become insufficient to meet the information storage capacity needed for recording in cameras or in other equipment.

Problems to be Solved by the Invention

A need exists for an in-camera magnetic recording and reproducing system that increases the amount of information that can be recorded in the MOF layer of the image area of a filmstrip with a single magnetic head array extended across the filmstrip width.

SUMMARY OF THE INVENTION

It is therefore an object of the present invention to provide a simplified system particularly for use by consumers or photofinishing professionals for recording and reproducing information as digitized data in multiple parallel tracks of the MOF layer in the filmstrip image frame areas.

These and other objects of the invention are realized in a method and apparatus for recording and reproducing photographic data by means of one or more magnetic head device(s) into a plurality of parallel data tracks extending lengthwise of a magnetic layer on a photographic filmstrip as first and second sub-sets of a photographic data set related to an image frame in a method and apparatus comprising the steps of and means for recording a first data sub-set associated with an image frame in a first sub-set of parallel data tracks on the magnetic layer in the image frame area as the filmstrip is transported past the magnetic recording device, and recording a second data sub-set associated with the image frame in a second sub-set of parallel data tracks interleaved with the first set of parallel data tracks on the magnetic layer in the image frame area as the film is transported past the magnetic recording device.

In one preferred embodiment, the recording devices comprise a single magnetic head array of m magnetic heads arranged to extend across the filmstrip and a stepping mechanism for stepping the magnetic head array between n/m positions to effect the recording or reproducing of n interleaved tracks. A variety of recording and reproducing schemes provide for an economical manner of recording and/or reproducing all of the photographic data related to a single image frame in the single image frame area. A further recording and/or reproducing scheme provides for the recording of each set of photographic data related to the scene captured in the image frame in one of n/m sub-sets of m tracks extending through a selected number of image frames, and staggering the recording and/or reproducing of each photographic data set.

In a further preferred embodiment, two or more fixed magnetic head arrays are positioned to extend across the filmstrip such that the m recording and/or reproducing heads of each array have equal pitch and are laterally offset to provide or follow n recording tracks in the image frame area in n/m sub-sets of m tracks. Recording and/or reproducing schemes provide for the recording and/or reproducing of the n/m sub-sets of data by switching between the magnetic head arrays during advancement of the filmstrip image frame past each head array.

The arrangement of magnetic head arrays and the various recording and/or reproducing schemes advantageously allow photographic data sets to be recorded in the n closely spaced tracks of the filmstrip magnetic layer in the image frame area with higher spacing density and efficiency than can be effected with a single fixed magnetic head array.

BRIEF DESCRIPTION OF THE DRAWINGS

These and other objects, advantages and features of the present invention will be more readily understood from the following detailed description of the preferred embodiments thereof, when considered in conjunction with the drawings, in which like reference numerals indicate identical or similar components throughout the several views, and wherein:

FIGS. 2A–2C are a schematic illustration of a first recording scheme for recording n/m sets of photographic data in the n image frame area tracks F0–Fn using a single head array and system of FIG. 1;

FIGS. 3A–3C are a schematic illustration of a second recording scheme for recording n/m sets of photographic data in the n image frame area tracks F0–Fn using a single head array and system of FIG. 1;

DETAILED DESCRIPTION OF THE PREFERRED EMBODIMENTS OF THE INVENTION

Figure 1:
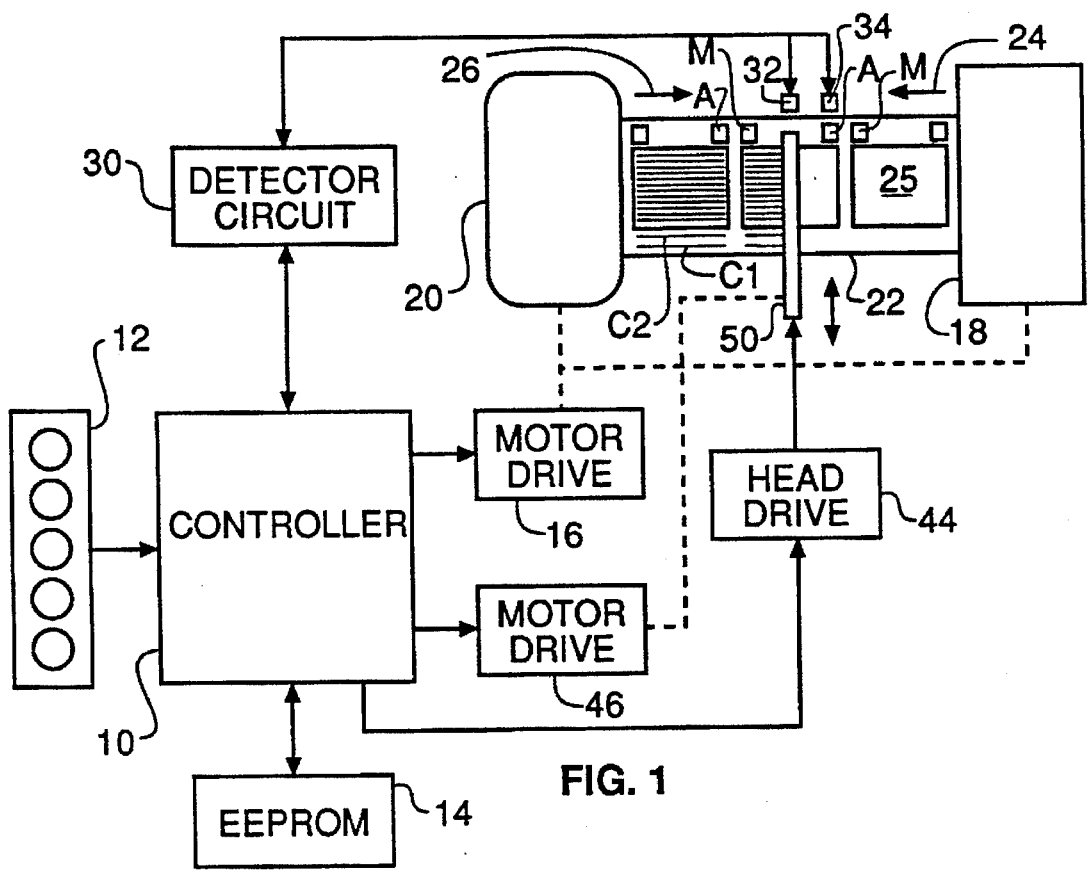
FIG. 1 is a schematic illustration of a system in accordance with a first embodiment of the present invention utilizing a single magnetic head array of m magnetic heads mounted to be stepped between n/m head positions to effect recording and/or reproducing in n image frame area tracks F0–Fn.
Figure 5:
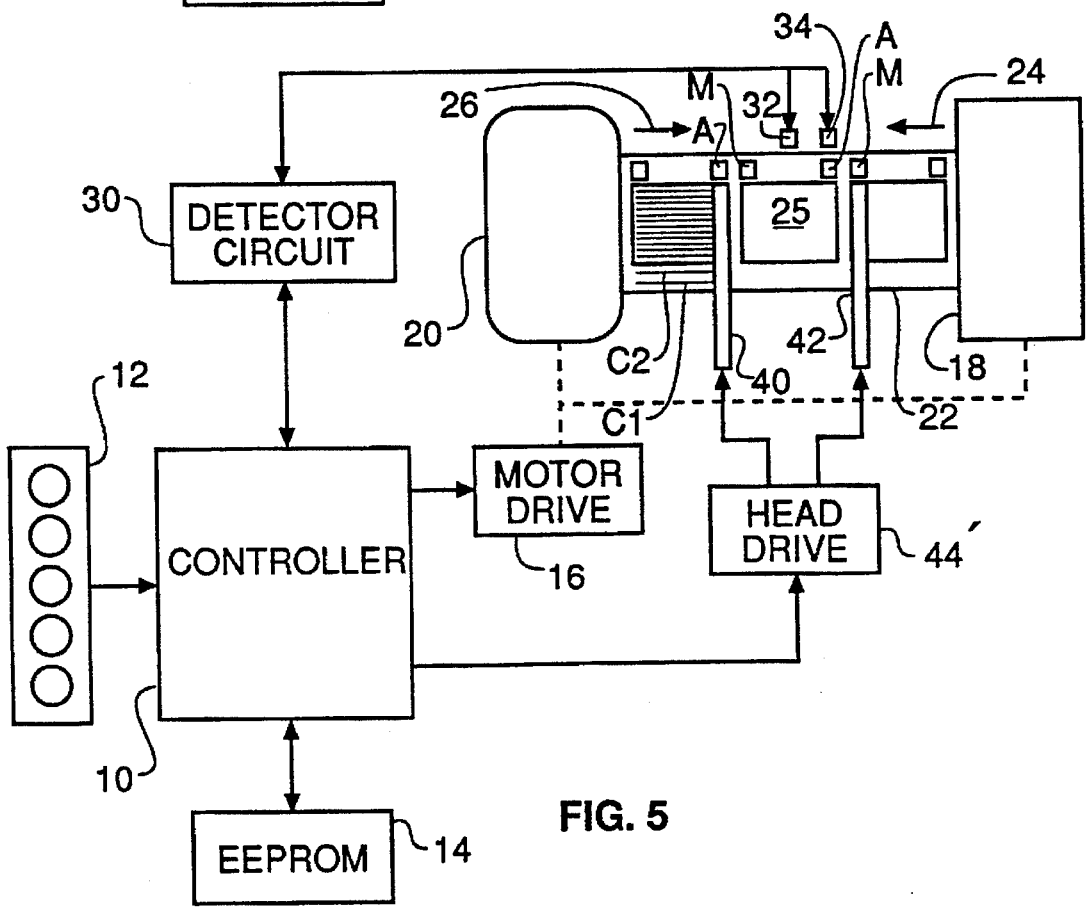
FIG. 5 is schematic illustration of a system in accordance with a second embodiment of the present invention utilizing two (or more) spaced magnetic head arrays of m recording heads mounted to extend across the filmstrip width and selectively energized to effect recording in n image frame area tracks F0–Fn.

In the following description, the systems of FIGS. 1 and 5 are preferably embodied in a camera system for either recording or reproducing information in the MOF layer tracks employing the recording schemes described hereafter. While the following description is directed to the camera implementation, it is intended that the described systems, including the magnetic head array(s) and other components, and the described steps of the recording scheme are cover the incorporation thereof in other magnetic recording and reproducing equipment. For example, such magnetic reproducing and recording equipment may include photofinishing equipment for transferring photographic information to and from tracks in the MOF layer, computer peripheral equipment for use in transferring photographic information to and from a personal computer and tracks of the filmstrip MOF layer, or the like. In such equipment, the filmstrip image frame may be viewed or scanned for display simultaneously or sequentially with relation to the recorded or read out photographic information. Moreover, the filmstrip may be separated from its cartridge or associated with it during the movement of the filmstrip with respect to the magnetic head array.

For simplicity, the description of the methods of operation of the preferred embodiments of FIGS. 1 and 5 will also be couched in terms of magnetic recording of photographic data related to image frames, although it will be understood that the apparatus and methods described are applicable to recording of data or information that may not be specifically directed to the image frames and to reproducing any such photographic data or information recorded in the tracks of the filmstrip.

Referring now to FIG. 1, portions of a photographic system associated with magnetic recording of information or photographic data in the MOF layer of a filmstrip 22 in accordance with a first preferred embodiment of the present invention is shown. In FIG. 1, controller 10 includes a microprocessor and related input/output and control circuits to control various functions of the camera operation. An input device 12 is provided to allow the camera user to input information, such as an image frame rifle and other messages related to the scene content, to controller 10. For example, the camera may be provided with a microphone and sound recording circuitry for processing voice messages or sound associated with the photographed scene into digital photographic data that may be recorded in digital format on certain tracks in the manners described hereafter. Other photographic information, such as date, time, exposure information, scene orientation and frame format are automatically provided in known manner to controller 10 from various sensors (not shown) in the camera.

A buffer 14, e.g. the depicted EEPROM or RAM or other conventional memory provides non-volatile data storage for temporarily storing the photographic data prior to commencement of advancement of the filmstrip. The stored data is retrieved from the buffer 14 and provided to the 1H head drive 44 in synchronization with the advancement of the filmstrip 22 and as long as it is at velocity as described below in greater detail FIG. 1 depicts the physical relationship between a linear, multi-track magnetic head array 50 mounted to extend across the filmstrip 22 width and the tracks F0–Fn that are recorded in the MOF layer within the image frame area 25 as the filmstrip 22 is moved in the film advance direction 24.

Additional edge tracks C1 and C2 are recorded alongside the image frame areas by two edge magnetic heads in the head array 50. The head array 50 may take the form of that disclosed in the above-referenced '532 application, incorporated herein by reference, comprising a linear arrangement of m discrete magnetic recording/reproducing heads spaced apart at a set pitch and mounted to extend across the width of the filmstrip image frame 25.

In the above-referenced '532 application, a linear magnetic recording and/or reproducing head array is proposed for use in recording and/or reproducing in spaced apart parallel tracks in the image frame area of the filmstrip MOF layer. The magnetic heads in the head array are shaped as prolate ellipsoids through a lapping process to conform with the cross-film curl of the filmstrip in the camera transport path where the head array is mounted. In the camera, the head array is mounted to extend across the filmstrip width in the film transport path to thereby provide optimal head-to-MOF layer compliance with minimal damage to the filmstrip. The magnetic head array provides the capability for recording in the number of tracks corresponding to the number of recording heads in the array, the tracks being spaced by the adjacent head spacing. The number of heads in an array is limited by the fabrication techniques and by the magnetic field size required to effect recording in the MOF layer, thereby limiting the number of the tracks C1, C2, and F0–Fn.

It will also be understood that the longitudinal recording in the tracks C1, C2, and F0–Fn is accomplished when the filmstrip 22 is moved past the magnetic head array 50, and magnetic flux reversals are generated at the recording surface of the recording heads in the linear head array 50. The characteristics of the filmstrip 22 and its MOF layer are described in the above-referenced '626 and '810 patents, incorporated herein by reference. The head-to-MOF layer interface is described further in the above-incorporated '175 and '532 patent applications.

A motor drive 16 is mechanically coupled to an internal spool of film cartridge 18 and to a take-up spool 20. The motor drive 16 is operated under the control of controller 10 to advance filmstrip 22 in a first, forward direction represented by arrow 24 from the cartridge to the take-up spool, frame by frame, as each image frame 25 is exposed. In a typical camera operation, once all image frames 25 are exposed, motor drive 16 is operated to rewind the filmstrip 22 in one continuous motion in a second, reverse direction, represented by arrow 26, from the take-up spool 20 to the film cartridge 18. In accordance with the various recording schemes described below in reference to FIGS. 2A–2C, 3A–3C, and 4A–4C, the advancement of the filmstrip 22 in the forward and reverse directions is varied from the typical manner.

A detector circuit 30 is coupled between controller 10, and opto-sensors 32 and 34 are positioned to sense apertures or "perfs" A (anticipation) and M (metering) to control the frame by frame advance of the filmstrip 22 and the recording of data in selected tracks among the tracks F0–Fn, C1 and C2 in accordance with the present invention. The output signals of opto-sensors 32 and 34 are provided to detector circuit 30 which in turn provides A-perf and M-perf sense signals, respectively, to controller 10. During advancement of the filmstrip 22 in the forward direction of arrow 24, the opto-sensor 32 serves as a metering sensor to detect metering the M-perf, and the M-perf sense signal is employed by the controller 10 to position an image frame 25 properly within the camera exposure gate.

In accordance with certain recording schemes described below used in the first embodiment of the present invention, recording (and reproducing) of sub-sets of the tracks F0–Fn are accomplished in two or more forward and reverse recording (and reproducing) passes of the filmstrip in the forward and rewind directions of arrows 24 and 26, respectively. Opto-sensor 34 serves as a velocity sensor to detect anticipation A-perf, and the A-perf sense signal is employed by the controller 10 to determine when recording is to be commenced in the sub-set of m tracks that the magnetic head array 50 is aligned with as filmstrip 22 is being advanced in the forward direction of arrow 24. During such reverse recording passes, the M-perf signal may be used by the controller 10 to determine the timing of recording when filmstrip 22 is at the recording velocity.

In this regard, after an exposure of the image frame 25 has been made and before each recording pass of the filmstrip 22 by the head array 50, the controller 10 operates the motor drive 16 to back-up filmstrip 22 a short initial distance opposite to the direction of the recording pass to a running start position. A forward acceleration ramp-up to speed follows, so that the filmstrip 22 is at a recording velocity by the time that a border of the image frame 25 reaches the magnetic head array 50. The forward and reverse recording passes begin at an image frame border, which is registered by the M-perf or the A-perf signal depending on the direction, and is completed by the end of the frame border which is registered by the other of the two signals.

One unique aspect of the filmstrip 22 is that an image frame 25 is registered with respect to a photographic image frame gate, e.g. a camera exposure gate, by the M-perf signal on detection of the M-perfs in the film, and recording of information related to the exposure of the image frame has to follow as the filmstrip 22 is advanced to the next image frame area. There is a desire to somehow retain some physical correlation between each exposed image frame and its associated photographic data. As described above, the plurality m of magnetic recording heads in the head array 50 can only be made so small and are at a set pitch defining the distance between adjacent tracks. Any space between the tracks is wasted. Also, there is the above-described ramp-up distance associated with bringing the filmstrip up to a constant velocity so that constant density recording can take place. These track spacing and length limitations, as well as the limitations and requirements described above with respect to the MOF layer and head compliance, present some unique problems in recording all of the desired information in the n tracks F0–Fn.

Referring now to FIGS. 2A–2C, an example of a first interleaved recording method or scheme by which data is recorded (and reproduced) on film 22 during film advance by the camera apparatus of FIG. 1 in the forward direction 24 is illustrated. In this example, the head array 50 is illustrated as having six equally spaced magnetic recording heads (m=6) to record in twelve tracks (n=12) in the image area 25 of a filmstrip 22 in two (n/m=2) passes of the filmstrip 22 past the head array 50. The head array 50 is stepped or shifted in the direction of arrow 99 into two positions which define the locations of the two interleaved sub-sets of tracks 1A–6A and 1B–6B.

The two interleaved data sub-sets "$S_1$" and "$S_2$" of the photographic information or data set to be recorded in relation to the image frame 25 are compiled by the controller 10 and temporarily stored in buffer 14. As described above with respect to FIG. 1, the filmstrip 22 is initially backed up to the running start position and then advanced in the forward PASS 1 of FIG. 2A. With the head array in position "A", tracks 1A–6A are written with the data sub-set A during the first forward PASS 1 of the filmstrip 22 advanced in the forward direction 24. When filmstrip advancement is halted by the motor drive 16 in response to the M-perf signal, the head array 50 is shifted in the direction of arrow 99 to position "B" by a shift signal from controller 10 provided to motor drive 46. The filmstrip 22 is rewound in the reverse direction to the running start position as shown during the BACK-UP illustrated in FIG. 2B. Tracks 1B–6B are written as the filmstrip 22 is advanced again in the forward direction during forward PASS 2 as shown in FIG. 2C.

Figure 8:
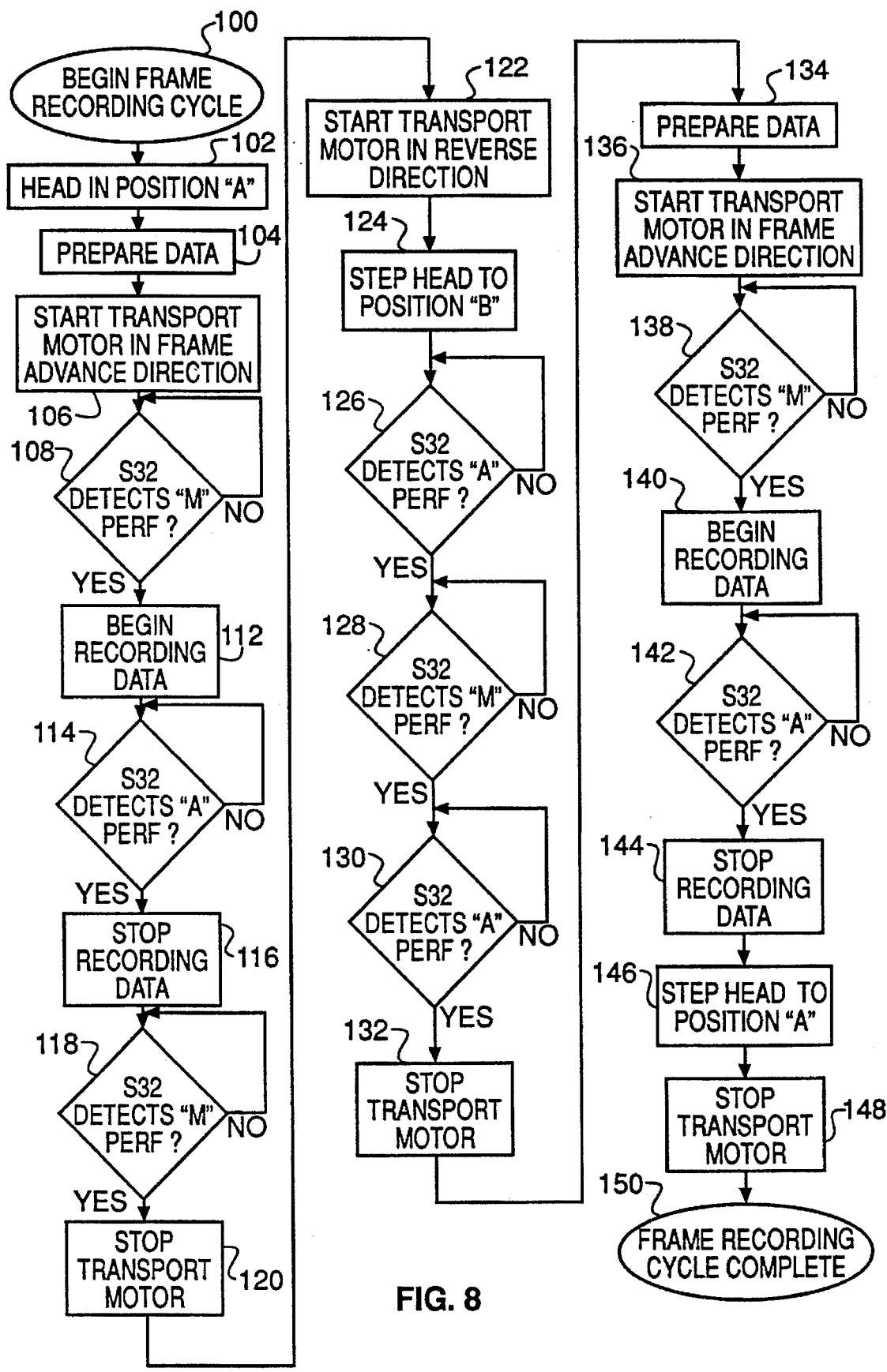
FIG. 8 is a flow chart associated with the illustrations of FIGS. 1 and 2A–2C used in the recording of data in successive forward advances of a filmstrip image frame.

The steps of the recording scheme of FIGS. 2A–2C are set forth in the flow chart of FIG. 8. In step 100, the frame recording cycle is commenced with the head 50 in position "A" in step 102. The data is divided into the two interleaved data sub-sets $S_1$ and $S_2$, and data sub-set $S_1$ is prepared in step 104, and the motor drive 16 is then energized to advance the filmstrip 22 in the forward direction 24 in step 106. At step 108, the opto-sensor 32 provides the M-perf signal, and recording of the data sub-set $S_1$ commences in block 112 at the leading border of the filmstrip image frame. When the A-perf is sensed in step 114, recording is stopped in step 116. Then, when the M-perf signal is generated in step 118, the motor drive signal is halted in step 120, and the filmstrip 22 decelerates and stops. In this manner PASS 1 of FIG. 2A is accomplished.

In steps 122–132, the BACK-UP operation of FIG. 2B is completed by starting the motor drive 16 in the reverse direction 26 in step 122. The head array 50 is stepped to the second end position B in step 124. The A-perf and M-perf signals are detected in steps 126–130, and the motor drive 16 is halted in step 132 on the second A-perf signal separated by an M-perf signal.

In steps 134–150, the PASS 2 operation of FIG. 2C is completed, and the head array is re-positioned to position A to be ready for the next image frame data recording cycle. The interleaved data sub-set $S_2$ is prepared in step 134, and the motor drive 16 is operated to advance the filmstrip again in the forward advance direction 24 in step 136. When the first M-perf signal is generated in step 138, recording in the interleaved tracks 1B–6B is commenced in step 140. When the A-perf signal is generated in step 142, recording is stopped in step 144. The head array 50 is re-positioned to position A in step 146, and the signal to the motor drive 16 is halted in step 148, thereby completing the frame recording cycle in step 150. The order of steps 146 and 148 may also be reversed.

Referring now to FIGS. 3A–3C, an example of a second interleaved recording method or scheme by which data is recorded (and reproduced) on film 22 during film advance by the camera apparatus of FIG. 1 is illustrated. In this example, the head array 50 is illustrated as having four equally spaced magnetic recording heads (m=4) to record in twelve tracks (n=12) in the image area 25 of a filmstrip 22 in three (n/m=3) passes of the filmstrip 22 past the head array 50. The head array 50 is stepped or shifted into three positions which define the locations of the three interleaved sub-sets of tracks 1A–4A, 1B–4B, and 1C–4C.

The three interleaved data sub-sets of the photographic data or information set to be recorded in relation to the image frame 25 are compiled by the controller 10 and temporarily stored in buffer 14. With the head array 50 in position "A", tracks 1A, 2A, 3A, and 4A are written with the data sub-set $S_1$ during the first forward PASS 1 of the filmstrip 22 advanced in the forward direction 24 as described above and as shown in FIG. 3A. When filmstrip advancement is halted by the motor drive 16, the head array 50 is shifted to position "B" by a shift signal from controller 10 provided to motor drive 46. The filmstrip 22 is advanced to a running start position, and the tracks 1B, 2B, 3B, and 4B are written with the second data sub-set $_2$ as the filmstrip 22 is advanced in the rewind direction during reverse PASS 2 as shown in FIG. 3B. Then, the head array 50 is shifted to position "C" by motor drive 46, and tracks 1C, 2C, 3C, and 4C are written with the data sub-set $S_3$ in the forward direction during forward PASS 3 as shown in FIG. 3C.

It should be noted that the data sub-set $S_2$ written during PASS 2 should be compiled by controller 10 in reverse order and recorded such that the data sub-set can be recovered by reproduce head arrays while the filmstrip 22 is advanced only in the forward direction. It should also be noted that the recording scheme of FIGS. 2A–2C could be accomplished with three forward recording passes, necessitating a rewind operation between the forward passes to reposition the filmstrip image frame beginning border with respect to the head array.

Figure 9:
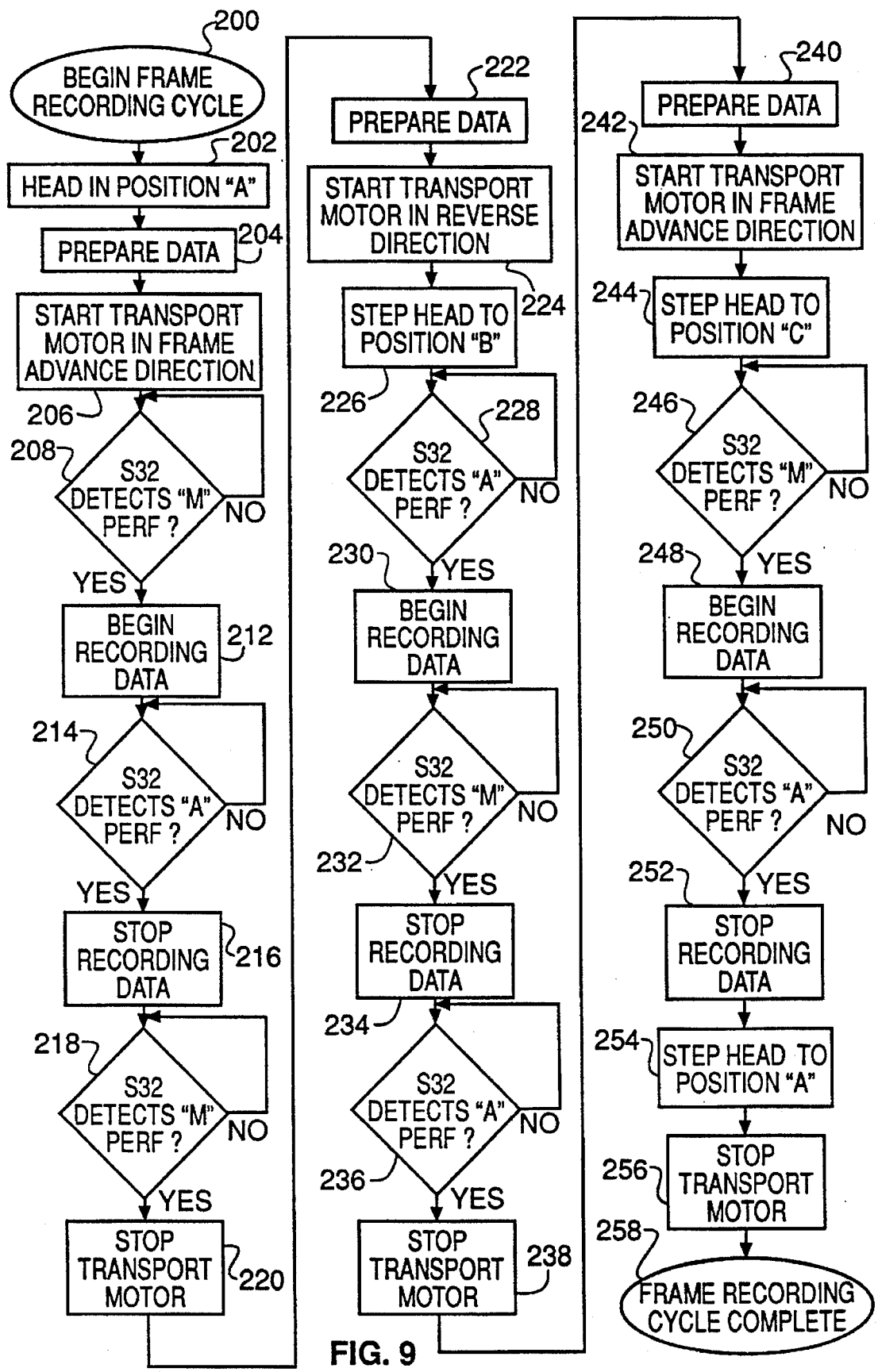
FIG. 9 is a flow chart associated with the illustrations of FIGS. 1 and 3A–3C used in the recording of data in forward and reverse motions of a filmstrip image frame.

The steps of the recording scheme of FIGS. 3A–3C are set forth in the flow chart of FIG. 9. In step 200, the frame recording cycle is commenced with the head 50 in position "A" in step 202. The data is divided into the three interleaved data sub-sets $S_1$, $S_2$ and $S_3$, and data sub-set $S_1$ is prepared in step 204, and the motor drive 16 is then energized to advance the filmstrip 22 in the forward direction 24 in step 206. At step 208, the opto-sensor 32 provides the M-perf signal, and recording of the data sub-set $S_1$ commences in block 212 at the leading border of the filmstrip image frame. When the A-perf is sensed in step 214, recording is stopped in step 116. Then, when the M-perf signal is generated in step 218, the motor drive signal is halted in step 220, and the filmstrip 22 decelerates and stops. In this manner PASS 1 of FIG. 3A is accomplished.

In steps 222–238, the PASS 2 operation of FIG. 3B is completed by preparing the second data sub-set $S_2$ in step 222 and starting the motor drive 16 in the reverse direction 26 in step 224. The head array 50 is stepped to the intermediate position B in step 226. The order of steps 222–226 may be altered. At step 228, the A-perf signal is generated, and recording of the data sub-set $S_2$ commences in block 230 at the trailing border of the filmstrip image frame. When the M-perf is sensed in step 232, recording is stopped in step 234. Then, when the A-perf signal is generated in step 236, the motor drive signal is halted in step 238, and the filmstrip 22 decelerates and stops.

In steps 240–258, the PASS 3 operation of FIG. 3C is completed, and the head array 50 is re-positioned to position A to be ready for the next image frame data recording cycle. The interleaved data sub-set $S_3$ is prepared in step 240, and the motor drive 16 is operated to advance the filmstrip again in the forward advance direction 24 in step 242. The head array is stepped to position C in step 244. Again, the order of steps 240–244 may be altered. When the first M-perf signal is generated in step 246, recording in the interleaved tracks 1C–4C is commenced in step 248. When the A-perf signal is generated in step 250, recording is stopped in step 252. The head array 50 is re-positioned to position A, in step 254 and the signal to the motor drive 16 is halted in step 256, thereby completing the frame recording cycle in step 258. The order of steps 254 and 256 may also be reversed.

The interleaved recording schemes described above require only one multi-track head array. The second interleaved recording scheme of FIGS. 3A–3C requires good filmstrip velocity control in the reverse direction 26 which is more difficult to attain. The interleaved recording scheme of FIGS. 2A–2C also requires a simple head stepping mechanism for moving the head array between two fixed end positions. The head stepping mechanism for the scheme of FIGS. 3A–3C inherently requires greater precision and control to locate the head array in the center position between the two end positions. Both of these interleaved recording schemes retain the one-to-one correspondence of the recording of the photographic data related to an image frame within the same image frame area. If necessary, the filmstrip 22 may be cut and spliced at the image frame boundaries, and the photographic data pertaining to that image frame will be retained.

Figure 4A:
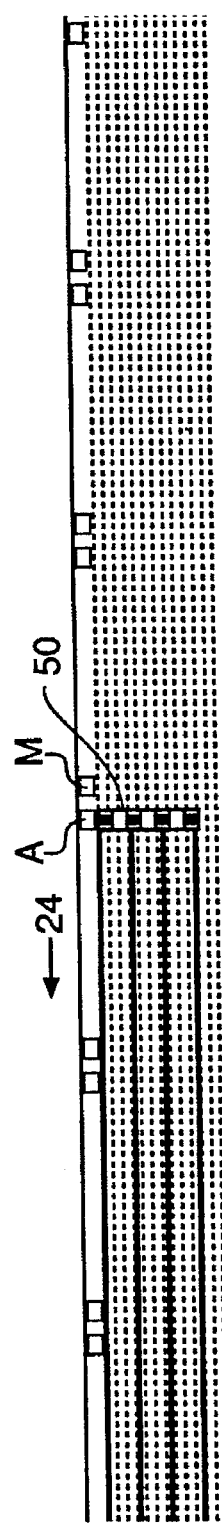
FIGS. 4A–4C is a schematic illustration of a third recording scheme for recording n/m sets of photographic data in the n image frame area tracks F0–Fn using a single head array and system of FIG. 1.
Figure 4B:
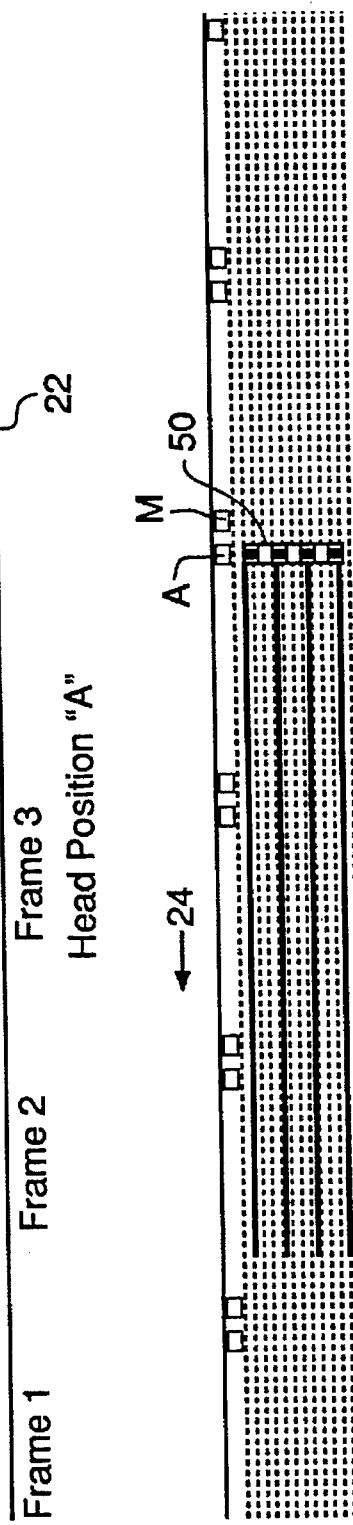
Figure 4C:
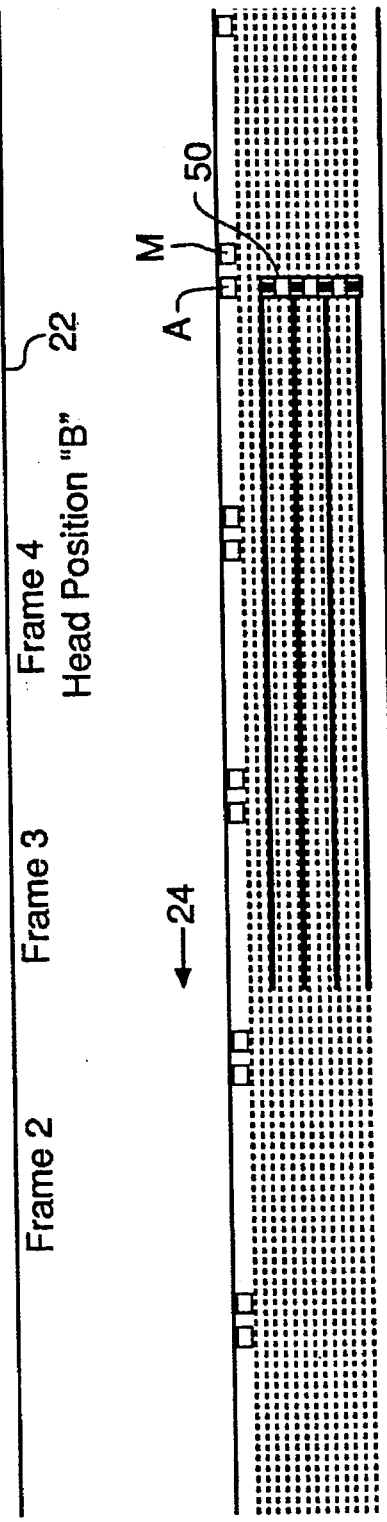

If the filmstrip 22 remains in the cartridge 18 and is never cut into individual frames, a third interleaved recording scheme may be used involving recording n/m sub-sets of m interleaved tracks extending through a series of image frames. This interleaved recording scheme is shown schematically in FIGS. 4A–4C and in the flow chart of FIG. 10, where n=12 and m=4. The recording scheme illustrated in FIGS. 4A–4C is of a succession of image frames labeled Frames 1–5 of a filmstrip 22 being advanced in the forward direction 24 past a single, fixed position, magnetic head array 50 over three successive image frame segments. The filmstrip 22 is rewound back to the next image frame position to be exposed, and the magnetic recording head is stepped or shifted to the next of three head positions, labeled "A", "B" and "C", across the filmstrip width by the motor drive 46 of FIG. 1 in a manner described above with respect to FIGS. 1 and 3A–3C. For simplicity of illustration, this recording scheme is illustrated for a four head, head array 50, but it will be clear for those skilled in the art that the same principles apply to all the tracks recorded by the single head array 50 of FIG. 1 in each of the shifted positions A–C. It will be understood that the head array 50 is not moved from its fixed position as shown in FIG. 1 along the direction of advancement of the filmstrip in the camera.

The illustration of this recording (and reproducing) scheme in FIGS. 4A–4C assumes that the first picture is taken as Frame 1, and that the head array (of FIG. 1) starts off in position "A". After the picture is taken, the filmstrip 22 is advanced in the forward direction 24, and the head array 50 starts recording the interleaved track set depicted in FIG. 4A. The continuous advancement and recording continues for three image frame distances metered by the detection of the M-perf signals so that the information associated with Frame 1 is recorded in multiple tracks extending from Frame 1 through Frame 3.

Then, the head array 50 is shifted to the next position "B", and the filmstrip 22 is rewound back two image frames plus the running start distance equivalent to the distance between the A and M perfs, without recording any tracks, to be ready to record information with respect to the taking of the picture in Frame 2. The same procedure is repeated to record information or photographic data corresponding to the image captured in Frame 2 in the second set of interleaved tracks on Frames 2–4 depicted in FIG. 4B. The head array 50 is then shifted to position "C". When a picture is taken on Frame 3, the head array is enabled to record the Frame 3 information in the third set of interleaved tracks on Frames 3–5 depicted in FIG. 4C. Then, the magnetic head array is shifted back to position "A", which is aligned with the first set of tracks so that the recording of the photographic data for the next image Frame 4 can commence where the recording of the photographic data for image Frame 1 ends.

Figure 10:
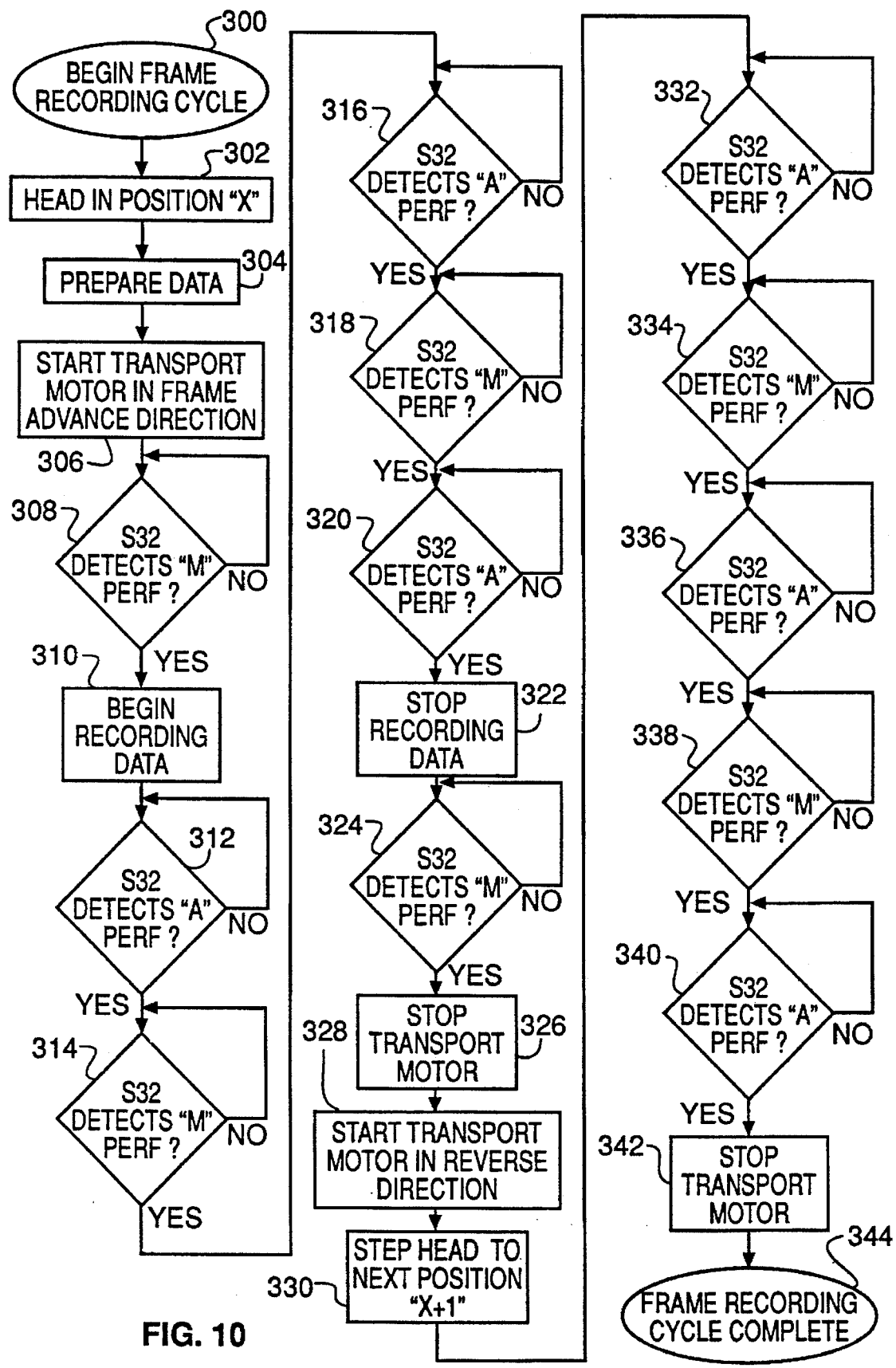
FIG. 10 is a flow chart associated with the illustrations of FIGS. 1 and 4A–4C used in the recording of data in forward motions of a filmstrip through three consecutive image frames.

The steps of the recording scheme of each of the FIGS. 4A–4C are set forth in the flow chart of FIG. 10. In other words, the steps of the flow chart of FIG. 10 are repeated for each pass illustrated in FIGS. 4A–4C. In step 300, the frame recording cycle is commenced with the head 50 in one of the positions "A", "B", or "C", designated position "X", in step 302 for recording the data set related to the image frame "X". The data set $S_X$ is prepared in step 304, and the motor drive 16 is then energized to advance the filmstrip 22 in the forward direction 24 in step 306.

The recording in the track sub-set of this example is over three image frames, and so the image frames are counted in steps 308–324, and the motor is stopped and the head array stepped to the next position "X+1" in step 330. At step 308, the opto-sensor 32 provides the M-perf signal, and recording of the data sub-set $S_X$ commences in block 310 at the leading border of the filmstrip image frame. Then, successive A-perfs and M-perfs are sensed and counted in steps 312–320. When three A-perf signals, separated by M-perf signals, are counted, recording is stopped in step 322. Then, when the next M-perf signal is generated in step 324, the motor drive signal is halted in step 326, and the filmstrip 22 decelerates and stops.

At this point, it is necessary to back up the filmstrip to the next image frame, by starting the motor drive 16 in step 328, and reposition the head array 50 to the "X+1" position in step 330. The successive A-perf signals and M-perf signals are counted in steps 332–338, and when three A-perf signals are counted, the motor drive 16 is disabled in step 342, and the frame recording cycle is completed. The next filmstrip image frame to be exposed is positioned in the camera exposure gate, and the head array 50 is in the next position "X+1" to allow recording of the next set of photographic data related to the exposure of the filmstrip image frame.

When the camera exposes the second from last and the last image frames on the filmstrip, part of the photographic data for those image frames may have to be buffered and recorded in the filmstrip leader on rewind of the filmstrip into the cartridge.

A number of variations on this recording scheme can be used. For example, depending on the frame storage requirements, the information can be recorded over less than, or more than, three image frame distances. The number of frames used will define the number of lateral positions the head array will be shifted. In other words, the head array will be shifted between two positions for two frame length recording tracks, three positions for three frame length recording tracks, etc. Other variations could be provided to first back up the filmstrip a predefined number of frames and then continuously record on the selected number of image frames.

This scheme requires only one multi-track, linear magnetic head array, and does not require good speed control in the rewind direction. This scheme may also eliminate several ramp-up cycles (over other multiple-pass schemes) and increase the available recording capacity slightly by recording on the spaces between image frames. It also eliminates a turn-around cycle when moving from frame set to frame set. The net advantages are the same lower head array and electronics or software costs as the first interleaved recording scheme of FIGS. 2A–2C, with less performance requirements on the film transport, and a slight gain in storage capacity. However, it does not retain the one-to-one correspondence of photographic data within the same image frame.

Of course, the number m of magnetic recording heads in the head array 50 will likely be greater than four or six as illustrated in the examples of FIGS. 2A–2C, 3A–3C and 4A–4C. The total number n of available tracks to be recorded in will depend on the possible number of magnetic recording heads that can be incorporated into the head array 50, and the widths of the recording heads and the resulting tracks. These numbers may govern the number of passes in the forward direction or the forward and reverse directions associated with the shifting of the head array 50. Of course, for battery conservation, it would be preferable to minimize the number of passes required.

In FIG. 5, a second embodiment of the system of the present invention is shown in which like components carry the same reference numerals as the camera system of FIG. 1. In the second embodiment, information or data recording is accomplished in the parallel, longitudinal data tracks F0–Fn, C1 and C2 by means of a pair of magnetic head arrays 40 and 42 in fixed positions extending across the filmstrip 22. The head arrays 40, 42 and corresponding opto-sensors 32 and 34 are located in upstream and downstream positions from the image frame in the camera exposure gate, thereby bracketing the unexposed image frame 25 in the exposure gate. Each head array 40, 42 comprises a plurality m magnetic recording heads that are driven by head drive 44' under the control of controller 10. An image frame is shown advanced in forward direction 24 past head array 40 downstream from the exposure gate after the recording of the photographic data in that image frame is completed. The image frame 25 is ready to be exposed after photographic data is entered by the user and then advanced as described below to effect the recording of the photographic data set.

The m magnetic recording heads of the magnetic head arrays 40 and 42 are evenly spaced apart by the same distance and therefore have the same pitch. The head arrays 40 and 42 are so mounted that they are mutually, laterally offset by one half the pitch such that the m tracks of the head array 40 are interleaved with the m tracks of the head array 42 and do not encroach upon one another. Since, as will be seen subsequently, only one head array 40 or 42 is actuated at a time in accordance with a feature of the recording scheme illustrated in FIGS. 6A and 6B, the head drive 44' may comprise a single shared head drive circuit of known design rather than two separate drive circuits. In the recording scheme of FIGS. 7A and 7B, the head arrays 40, 42 are positioned next to one another so that recording time overlaps, and separate head drive circuits are required.

Figure 6A:
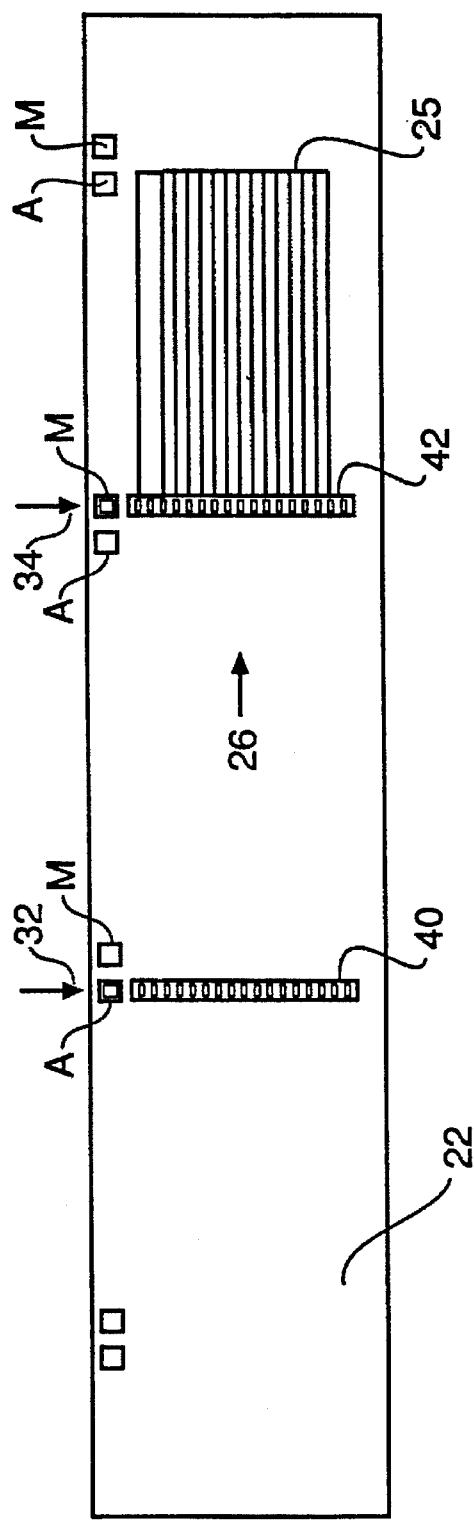
FIGS. 6A and 6B are a schematic illustration of a fourth recording scheme for recording n/m sets of photographic data in the n image frame area tracks F0–Fn in accordance with the second embodiment of the invention.
Figure 6B:
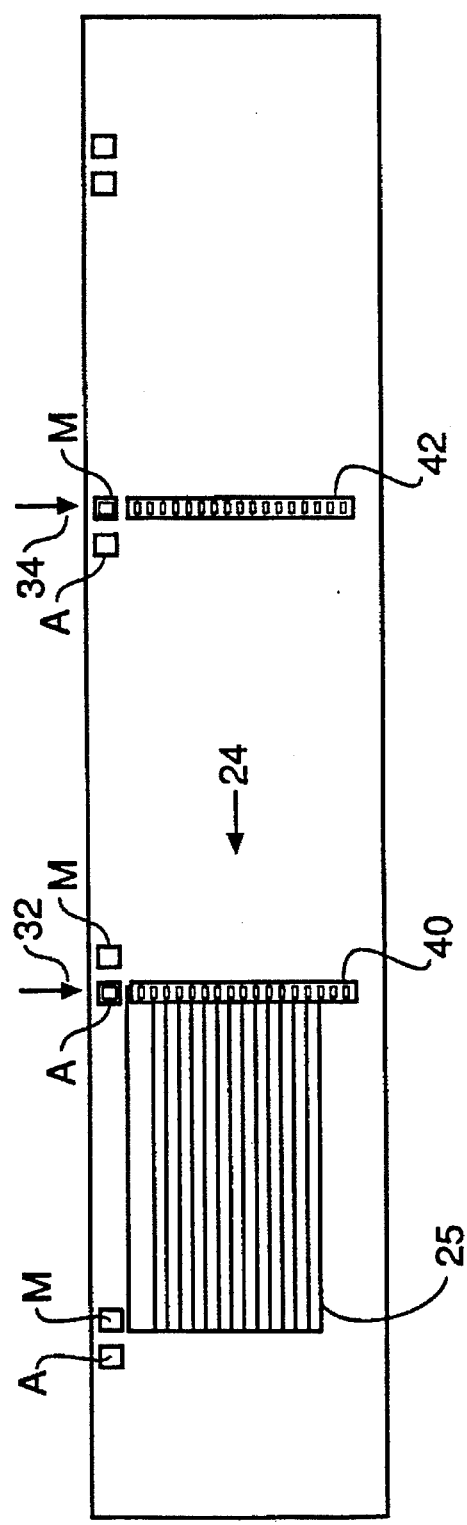

In the first fixed head array recording scheme illustrated in regard to FIGS. 6A and 6B, the opto-sensors 32 and 34 are employed to generate both A-perf and M-perf signals, depending on the direction of advancement 24, 26. A first photographic information or data sub-set $S_1$ related to the image frame 25 is compiled by the controller 10 to be recorded in a corresponding first sub-set of m interleaved tracks in the same image frame 25. The first data sub-set $S_1$ is preferably compiled in reverse order. The filmstrip 22 is then first advanced from the position depicted in FIG. 5 in the reverse direction 26 and stopped in the intermediate position as shown in FIG. 6A as opto-sensor 34 generates M-perf and A-perf signals.

When the trailing (in the forward advance direction) border of the exposed image frame 25 reaches the head array 42, the head array 42 is supplied from controller 10 with the first photographic information or data sub-set related to the image frame 25, and the recording in the sub-set of interleaved tracks takes place until the leading border of the image frame 25 frame is reached. The borders are detected by signals from the opto-sensor 34.

The head array 42 is then no longer energized, and the filmstrip is advanced in the forward direction 24 through an image frame length until the leading border of previously recorded frame reaches the head array 40. At that point, the head array 40 is supplied with the second information or data sub-set $S_2$ related to the image frame 25, and the recording in the corresponding second sub-set of interleaved tracks takes place as the filmstrip continues to be advanced in the forward direction 24. When the trailing border of the exposed frame 25 passes by the head array 40, the opto-sensor 32 generates an A-perf signal and advancement is halted in the position of FIG. 6B. Then, it is necessary to re-position the image frame between the head arrays 40, 42 by advancing the filmstrip 22 in the reverse direction 26. The resulting ending position is also shown in FIG. 5. The advancement and positioning of the image frame is monitored in response to A-perf and M-perf signals generated by the opto-sensor 32.

Figure 11:
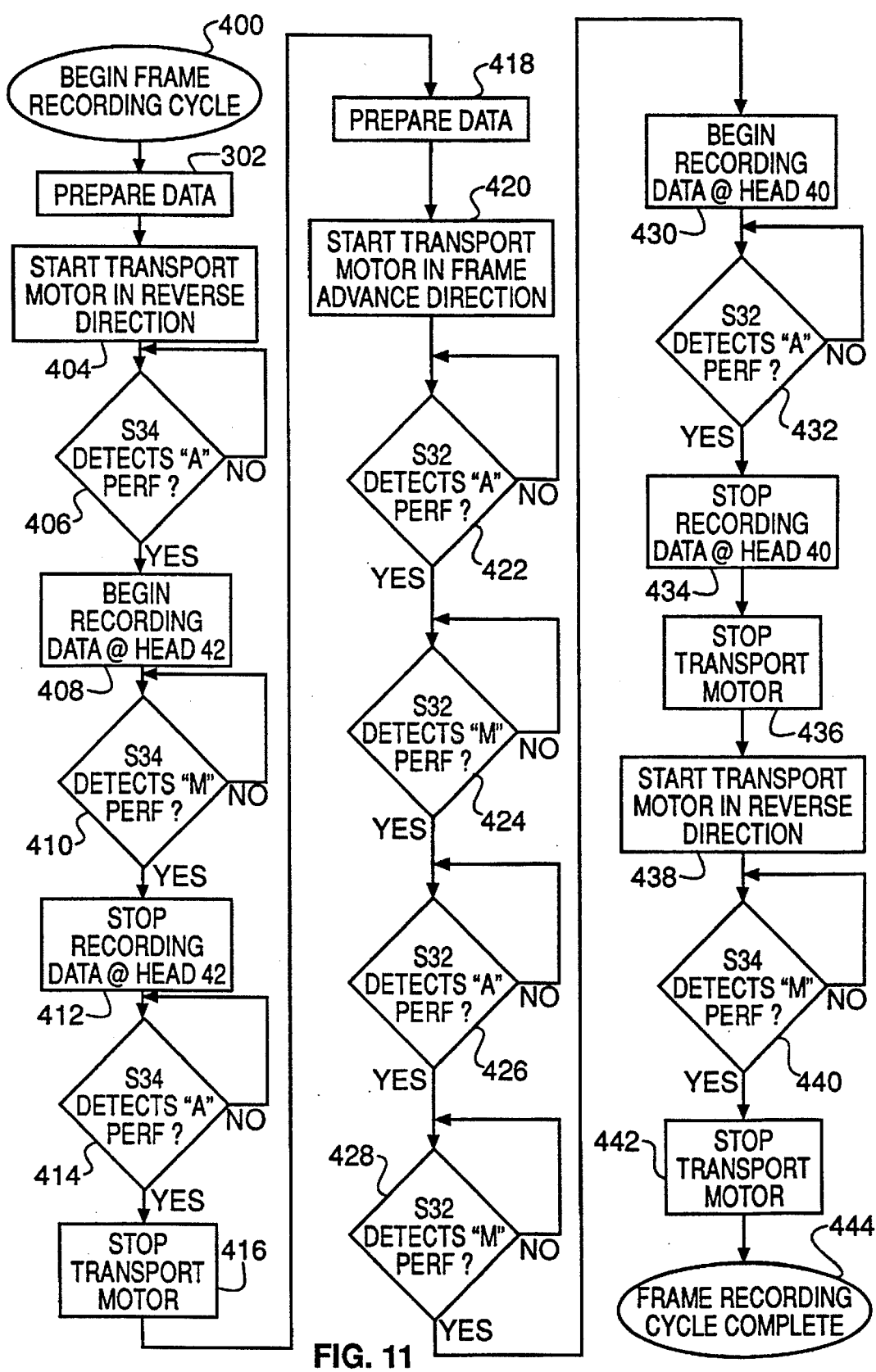
FIG. 11 is a flow chart associated with the illustrations of FIGS. 5 and 6A–6B used in the recording of data in successive reverse and forward advance motions of a filmstrip image frame with respect to a pair of staggered head arrays positioned an image frame or more apart.

Turning to FIG. 11, it depicts a flow chart of the steps of the recording scheme of FIGS. 6A–6B. It is assumed in step 400 that the exposed image frame is initially positioned as in FIG. 5 so that the perf sensor 34 is aligned so that it sill detect an A-perf on advancement, and the filmstrip image frame 25 is positioned between the two head arrays 40 and 42. The photographic data set for image frame 25 is divided into the two interleaved data sub-sets $S_1$ and $S_2$, and data sub-set $S_1$ is prepared in step 402 for delivery to head array 42. In this case, the data sub-set is compiled in reverse order. The motor drive 16 is then energized to advance the filmstrip 22 in the reverse direction 26 in step 404. At step 406, the A-perf signal is generated by opto-sensor 34, and recording of the data sub-set $S_1$ using head array 42 commences in step 408 at the trailing border of the filmstrip image frame 25. When the M-perf is sensed in step 410, recording is stopped in step 412. Then, when the A-perf signal is generated in step 414, the motor drive signal is halted in step 416, and the filmstrip 22 decelerates and stops.

In steps 418–428, the filmstrip image frame is advanced in the forward direction 24 until the leading border is aligned with the head array 40, and in steps 430–436, the recording of the second data sub-set $S_2$ is accomplished. The filmstrip is returned to the next exposure position in steps 438–444.

In step 418, the second data sub-set $S_2$ is prepared for recording using head array 40. The motor drive 16 is powered to advance the filmstrip in the forward direction 24 in step 420. The order of these steps may be altered. The A-perf and M-perf signals are detected in steps 422–428, and recording is commenced in step 430 on detection of the second M-perf. In step 432, the A-perf signal is generated, and recording is stopped in step 434. The motor drive 16 is halted in step 436, thereby completing the frame recording cycle.

At this point, it is necessary to re-position the image frame slightly to the position shown in FIG. 6B. The filmstrip is driven in the reverse direction in step 438, and the advancement is halted in step 442 on the detection of the next M-perf signal by opto-sensor 34 in step 440. The next image frame to be exposed is now positioned in the camera exposure gate in step 444.

Alternatively, the first information sub-set $S_1$ is not compiled in reverse order or recorded during the reverse advancement of the filmstrip 22. Instead recording is not commenced until after the forward advancement of the filmstrip is commenced from the position of the image frame 25 depicted in FIG. 6A.

The sequence of filmstrip movements and delivery of the compiled information or data sub-sets $S_1$ and $S_2$ to the magnetic head arrays 40, 42 may be rearranged, but these illustrated sequences are the simplest involving the least number of filmstrip movements resulting in the next image frame being positioned in the camera exposure gate ready for the next exposure.

Figure 7A:
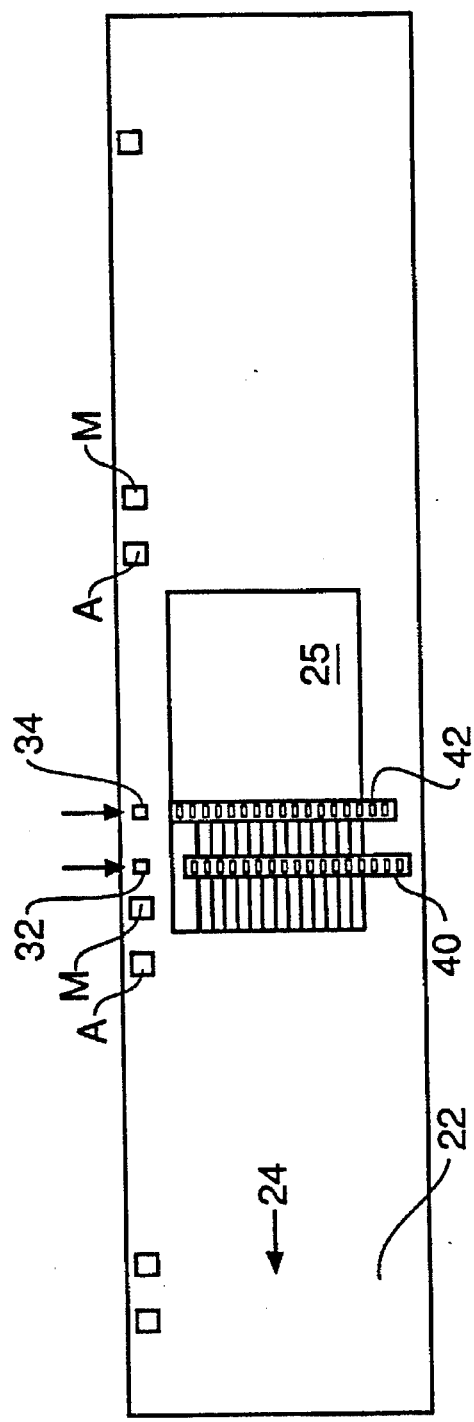
FIGS. 7A and 7B are a schematic illustration of a fifth recording scheme for recording n/m sets of photographic data in the n image frame area tracks F0–Fn in accordance with the second embodiment of the invention.
Figure 7B:
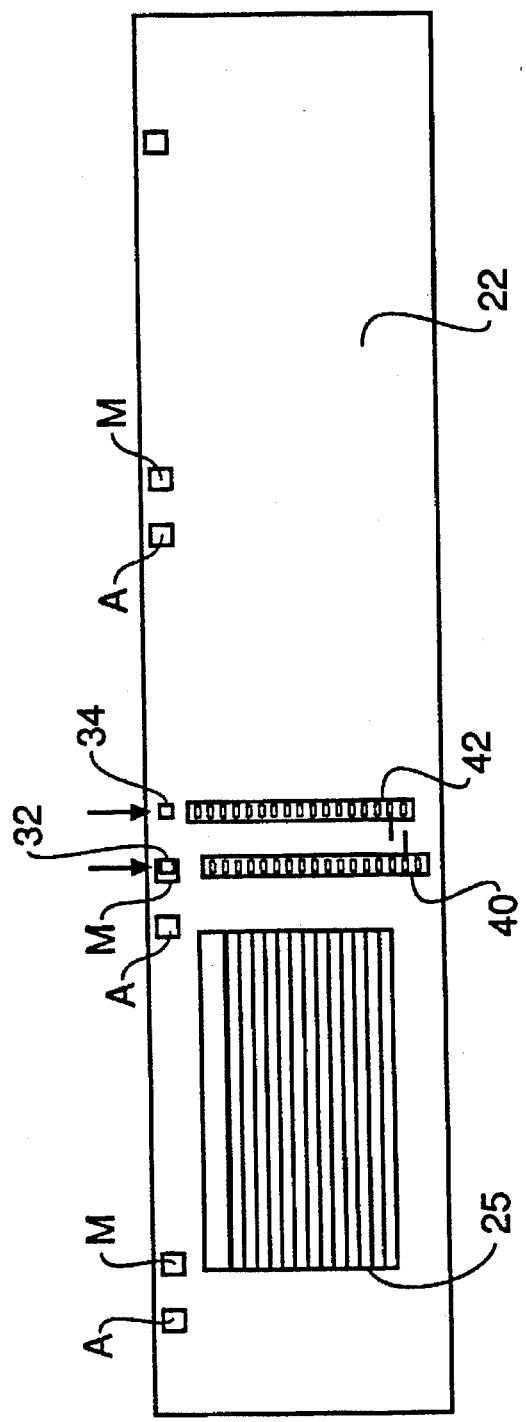

Turning to FIGS. 7A and 7B, they illustrate a further interleaved recording (and reproducing) scheme employing two magnetic head arrays 40, 42 fixed in position with their tracks offset such that the interleaved track sub-sets do not overlap. Head arrays 40 and 42 are also separated by some short longitudinal displacement in the direction of filmstrip transport, preferably along one side of the exposure gate. Consequently, the head array 40, 42 positioning and recording scheme of FIGS. 7A and 7B represents a modification of the second embodiment system of FIG. 5, in that the fixed position head arrays 40, 42 are both located on one side of the camera exposure gate and are operated by head drive 44'.

In the scheme of FIGS. 7A and 7B, after the image frame 25 is exposed, a first photographic information or data sub-set $S_1$ related to the image frame 25 is compiled by the controller 10 to be recorded in a corresponding first sub-set of interleaved tracks in the same image frame 25 by the head array 40. If necessary, the filmstrip 22 is then first advanced in the reverse direction 26 and halted at a running start position. The filmstrip 22 is then advanced in the forward direction 24. When the leading border of the exposed image frame 25 reaches the head array 40 as indicated by the M-perf signal generated by opto-sensor 34, the head array 40 is supplied from controller 10 with the first photographic information or data sub-set $S_1$ related to the image frame 25, and the recording of the first data sub-set $S_1$ in the second sub-set of interleaved tracks takes place until the end of the image frame 25 frame is reached as indicated by the A-perf signal generated by opto-sensor 34.

Similarly, when the leading border of the exposed image frame 25 reaches the head array 42 as indicated by the M-perf signal generated by opto-sensor 32, the head array 42 is supplied from controller 10 with the second photographic information or data sub-set $S_2$ related to the image frame 25, and the recording of the second data sub-set $S_2$ in the second sub-set of interleaved tracks takes place. FIG. 7A illustrates the recording of both data sub-sets in the corresponding recording track sub-sets during filmstrip advance in the forward direction 24. When the trailing border of the image frame 25 frame is reached as indicated by the A-perf signal generated by opto-sensor 32, filmstrip advance is halted. The filmstrip may come to rest somewhat out of position with the head arrays 40, 42 and opto-sensors 32, 34 as shown in FIG. 7B and re-positioning of the next filmstrip image frame to be exposed to a starting position may then be effected.

Figure 12:
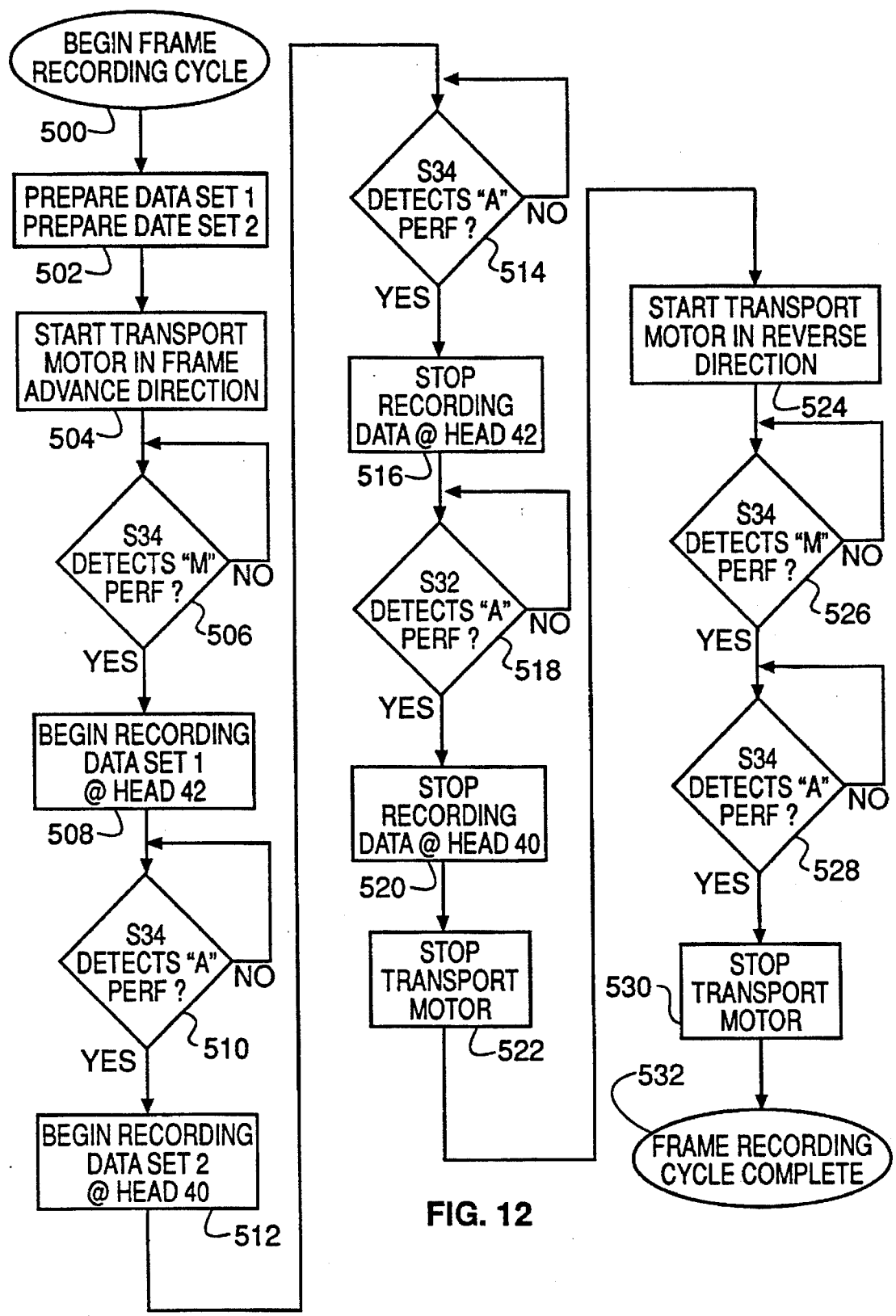
FIG. 12 is a flow chart associated with the illustrations of FIGS. 5 and 7A–7B used in the recording of data in forward motions of a filmstrip image frame with respect to a pair of staggered head arrays closely positioned on one side of an image frame.

Turning to FIG. 12, it depicts a flow chart of the steps of the recording scheme of FIGS. 7A-7B. It is assumed in step 500 that the exposed image frame is initially positioned with opto-sensor 34 somewhat to the left of an M-perf. The photographic data set for image frame 25 is divided into the two interleaved data sub-sets $S_1$ and $S_2$ and prepared in step 502 for delivery to the respective head arrays 42 and 40. In this case, the data sub-sets are both compiled in the same order. The motor drive 16 is then energized to advance the filmstrip 22 in the forward direction 24 in step 504. At step 506, the M-perf signal is generated by sensor 34, and recording of the data sub-set $S_1$ using head array 42 commences in step 508 at the leading border of the filmstrip image frame 25. When the M-perf is sensed by opto-sensor 32 in step 510, the recording of the second data sub-set $S_2$ in the second sub-set of recording tracks is commenced by head array 40 in step 512.

When the next A-perf signal is generated by opto-sensor 34 in step 514, recording by head array 42 of the first data sub-set $S_1$ is halted in step 516. When the next A-perf signal is generated by opto-sensor 32 in step 518, recording by head array 40 of the second data sub-set $S_2$ is halted in step 520. The motor drive signal is halted in step 522, and the filmstrip 22 decelerates and stops.

In steps 524–532, the next filmstrip image frame to be exposed is advanced in the reverse direction 26 until the trailing border of the recorded image frame is aligned with the head array 42. In step 524, the motor drive 16 is powered to advance the filmstrip in the reverse direction 26. The M-perf and A-perf signals are detected in steps 526 and 528, filmstrip advancement is halted in step 530, thereby completing the frame recording cycle in step 532.

The forward and reverse filmstrip movements are controlled by the controller 10 in response to the M-perf and A-perf signals as described above. The interleaved recording (and reproducing) schemes of FIGS. 6A–6B and 7A–7B require the two (or more) multi-track head arrays precisely fixed in position with respect to one another, but do not require a precision head stepping mechanism.

The second embodiment of the camera system depicted in FIG. 5, and preferably with the head arrays arranged as in the interleaved recording scheme of FIGS. 7A and 7B may alternatively be used in a single pass recording scheme. In this variation, a large capacity buffer 14 is filled with interleaved data sub-sets $S_1$, $S_2$ for each exposed image frame compiled in reverse order. When all of the frames are exposed, the interleaved data sub-sets are withdrawn and supplied to the head arrays 40, 42 as each leading border of each image frame passes by the magnetic head arrays 40, 42 during the reverse pass of the filmstrip in the rewind direction. In this "streaming" single pass, interleaved recording scheme, the recording may be continuous, with image frames identified in the recorded tracks, or the M-perf and A-perf signals may be employed for timing the recording in each respective image frame area. Of course, the reverse compilation of the data may be avoided by first rewinding the filmstrip back into the cartridge and then recording as the filmstrip is continuously or intermittently advanced again from the cartridge. This would then require a final rewind operation, and offers no significant advantage over the preferred streaming scheme. This interleaved recording scheme could also be practiced with the more widely spaced magnetic head arrays 40, 42 illustrated in FIGS. 5 and 6A–6B.

It will be understood that in each of the above described preferred embodiments, the data sub-sets $S_1, S_2, \ldots S_{n/m}$ are recorded in corresponding sub-n/m sub-sets of m data tracks among the n total tracks F0–Fn (optionally including one or more of the edge tracks C1, C2). It will also be understood that the data sub-sets may include a clock pulse train recorded in one of the m tracks of each sub-set, and that the n/m data sub-sets may be uneven in number and not use all of the available tracks of each corresponding track sub-set.

It will also be understood that the above-described filmstrip 22 configuration and the use of the A-perf signals and M-perf signals in the various recording schemes is illustrative of a preferred filmstrip type in which the embodiments of the present invention may be practiced. However, other perforation and filmstrip configurations, including known 135 mm film types, as well as other image frame leading and trailing edge border sensors may be employed than the opto-sensors 32 and 34.

It will further be understood that each of the above described systems and recording schemes may also be employed for reproducing the sub-sets of photographic data already recorded in the n tracks by the stepped magnetic head array of the embodiment of FIG. 1 or the pair of laterally staggered head arrays of FIG. 5. The specific "recording" steps as described above may constitute reproducing steps. It will be apparent that certain of the steps, e.g. the "prepare data" steps may not be applicable and can be bypassed. It should also be noted that the ability to employ certain of the recording schemes described above particularly for laterally positioning the single magnetic head array 50 with respect to the n/m sub-sets of tracks may not be usable if the filmstrip can only be advanced in one direction in the reproducing equipment.

In this regard, the recording schemes of FIGS. 6A–6B and 7A–7B and the corresponding flow charts of FIGS. 11 and 12 may be readily adapted and employed for reproducing photographic data sets previously recorded using the two (or more) fixed magnetic head arrays 40 and 42 or by the single, laterally positioned magnetic head array 50 using any of the recording schemes described above. The flow chart of FIG. 8, corresponding to the recording scheme of FIG. 2, may also be readily adapted to reproduce photographic data sets previously recorded with the single, laterally positioned head array 50 in all of the recording schemes described above with a corresponding laterally positionable head array 50. Of course, the former arrangement may be necessary in external photographic photofinishing equipment and peripheral equipment where the filmstrip is typically advanced in only one direction.

While there has been shown what are considered to be the preferred embodiments of the invention, it will be manifest that many changes and modifications may be made therein without departing from the essential spirit of the invention. It is intended, therefore, in the following claims to cover all such changes and modifications as may fall within the true scope of the invention.

| PARTS LIST FOR FIGS. 1– | |
|---|---|
| 10 | controller |
| 12 | input device |
| 14 | buffer |
| 16 | motor drive |
| 18 | film cartridge |
| 20 | take-up spool |
| 22 | photographic film |
| 24 | forward direction |
| 25 | image frames |
| 26 | rewind direction |
| 30 | detector circuit |
| 32 | A perf opto-sensor |
| 34 | M perf opto-sensor |
| 40 | magnetic head array |
| 42 | magnetic head array |
| 44 | recording head drive |
| 46 | head shift drive |
| 50 | magnetic head array |
| A | anticipation film perf |
| M | metering film perf |
| 100–150 | steps of first scheme |
| 200–258 | steps of second scheme |
| 300–344 | steps of third scheme |
| 400–444 | steps of fourth scheme |
| 500–532 | steps of fifth scheme |

What is claimed is:

1. A method of recording or reproducing first and second sub-sets of a photographic data set related to a photographic image frame of a filmstrip by means of a magnetic record/reproduce head array into or from parallel data tracks extending lengthwise of said filmstrip and arranged across said image frame in a magnetic recording layer formed on the photographic filmstrip, the method comprising the steps of:

recording or reproducing a first data sub-set associated with an image frame in a first sub-set of parallel data tracks on said magnetic layer in said image frame area as the filmstrip is transported past said magnetic record/reproduce head array; and recording or reproducing a second data sub-set associated with said image frame in a second sub-set of parallel data tracks interleaved with said first set of parallel data tracks on said magnetic layer in said image frame area as the film is transported past said magnetic record/reproduce head array.

2. A method of recording n/m sub-sets of a photographic data set in relation to a photographic image frame into like n/m interleaved sub-sets of m or fewer data tracks in a magnetic recording layer on a photographic filmstrip comprising the steps of:

positioning at least one set of m individual, spaced apart magnetic recording heads in an array extending laterally across the width of said photographic filmstrip;

transporting said filmstrip transversely with respect to said m recording heads in a transport direction;

energizing said m recording heads and recording a first sub-set of said photographic data set associated with a photographic image frame in a first sub-set of m data tracks on the filmstrip magnetic layer across the image frame area thereof as said filmstrip is transported in said transport direction; and energizing said m recording heads and recording one or more subsequent sub-sets of said photographic data set associated with said image frame in a one or more further sub-sets of m data tracks on the filmstrip magnetic layer across the image frame area thereof as said filmstrip is transported in said transport direction with respect to said m recording heads such that said subsequent sub-sets of m data tracks are recorded in parallel and interleaved with respect to said first and each preceding sub-set of m data tracks across said image frame area of said filmstrip.

3. The method of claim 2 further comprising the step of:

between transporting and recording steps, shifting the relative transverse positions of said recording heads and said filmstrip such that said m recording heads are positioned into alignment with a further sub-set of m data tracks interleaved with respect to previously recorded sub-sets of m data tracks.

4. The method of claim 3 further comprising the steps of:

transporting said filmstrip in a fast direction while recording said first sub-set of photographic data in said first sub-set of m data tracks; and after shifting the relative transverse positions of said recording heads and said filmstrip such that said m recording heads are positioned into alignment with a second sub-set of m data tracks, transporting said filmstrip in a second direction while recording a second sub-set of photographic data in a second sub-set of m data tracks.

5. The method of claim 4 further comprising the steps of:

after shifting the relative transverse positions of said recording heads and said filmstrip such that said m recording heads are positioned into alignment with a third sub-set of m data tracks, transporting said filmstrip in said first direction while recording a third sub-set of photographic data in said third sub-set of m data tracks.

6. The method of claim 2 wherein said magnetic recording heads are spaced apart in a head array at a certain pitch and further comprising the step of:

between transporting and recording steps, laterally shifting said magnetic head array with respect to the width of said filmstrip a distance less than the pitch distance between the spaced apart magnetic recording heads such that said m recording heads are positioned into alignment with a further sub-set of m data tracks interleaved with respect to previously recorded sub-sets of m data tracks.

7. The method of claim 6 further comprising the steps of:

transporting said filmstrip in a first direction while recording said first sub-set of photographic data in said first sub-set of m data tracks; and after shifting said head array into alignment with a further sub-set of m interleaved data tracks, transporting said filmstrip in a second direction while recording a further sub-set of photographic data in said further sub-set of m data tracks.

8. The method of claim 6 further comprising the steps of:

transporting said filmstrip in a first direction from a starting position while recording said first sub-set of photographic data in said first sub-set of m data tracks;

transporting said filmstrip in said second direction back to said starting position prior to recording a second sub-set of photographic data in a second interleaved sub-set of m data tracks; and transporting said filmstrip in said first direction while recording said second sub-set of photographic data in said second interleaved sub-set of m data tracks.

9. A method of recording two sub-sets of a photographic data set in relation to a photographic image frame of a photographic filmstrip into two interleaved sub-sets of data tracks in a magnetic recording layer on said photographic filmstrip comprising the steps of:

positioning a first set of individual, spaced apart recording heads in an array extending laterally across the width of said photographic filmstrip such that said recording heads may record in a first sub-set of spaced apart data tracks in said magnetic recording layer;

positioning a second set of individual, spaced apart recording heads in an array extending laterally across the width of said photographic filmstrip at a predetermined distance from said first set such that said recording heads may record in a second sub-set of spaced apart data tracks interleaved with said first sub-set of spaced apart data tracks;

transporting said filmstrip in a transport direction past said first and second sets of recording heads;

energizing said first set of recording heads and recording a first sub-set of said photographic data set associated with an image frame in said first sub-set of data tracks on the filmstrip magnetic layer across the image frame area thereof as said filmstrip is transported in said transport direction; and energizing said second set of recording heads and recording one or more subsequent sub-sets of said photographic data set associated with said image frame in said second sub-set of data tracks on the filmstrip magnetic layer across the image frame area thereof as said filmstrip is transported in said transport direction such that said subsequent sub-sets of data tracks are recorded in parallel and interleaved with respect to said first sub-set of data tracks across said image frame area of said filmstrip.

10. The method of claim 9 wherein:

said first positioning step further comprises the step of positioning said first set of individual, spaced apart recording heads in a first array extending laterally across the width of said photographic filmstrip on a first side of a photographic image frame gate; and said second positioning step further comprises the step of positioning said second set of individual, spaced apart recording heads in a second array extending laterally across the width of said photographic filmstrip on a second side of a photographic image frame gate.

11. The method of claim 10 wherein said transporting step further comprises the steps of:

first, transporting a filmstrip image frame in a reverse direction out of said photographic image frame gate past said first set of recording heads after an exposure of the image frame has been made in said exposure gate;

halting said transporting of said filmstrip in said reverse direction;

secondly, transporting said filmstrip in a forward direction back past said first set of recording heads, through said photographic image frame gate, and past said first said second set of recording heads; and halting said transporting of said filmstrip in said forward direction when a next filmstrip image frame area to be exposed is located in said exposure gate.

12. The method of claim 11 wherein:

said first energizing step further comprises first energizing said first set of recording heads and recording a first sub-set of said photographic data set associated with an image frame in said first sub-set of data tracks on the filmstrip magnetic layer across the image frame area thereof as said filmstrip is transported in said rewind direction past said first set of recording heads; and said second energizing step further comprises secondly, energizing said second set of recording heads and recording one or more subsequent sub-sets of said photographic data set associated with said image frame in said second sub-set of data tracks on the filmstrip magnetic layer across the image frame area thereof as said filmstrip is transported in said forward direction past said second set of recording heads such that said subsequent sub-sets of data tracks are recorded in parallel and interleaved with respect to said first sub-set of data tracks across said image frame area of said filmstrip.

13. The method of claim 11 wherein:

said first energizing step further comprises first energizing said first set of recording heads and recording a first sub-set of said photographic data set associated with an image frame in said first sub-set of data tracks on the filmstrip magnetic layer across the image frame area thereof as said filmstrip is transported in said forward direction past said first set of recording heads and back into said photographic image frame gate; and said second energizing step further comprises secondly, energizing said second set of recording heads and recording one or more subsequent sub-sets of said photographic data set associated with said image frame in said second sub-set of data tracks on the filmstrip magnetic layer across the image frame area thereof as said filmstrip is transported in said forward direction past said second set of recording heads such that said subsequent sub-sets of data tracks are recorded in parallel and interleaved with respect to said first sub-set of data tracks across said image frame area of said filmstrip.

14. Apparatus for recording or reproducing first and second sub-sets of a photographic data set related to a photographic image frame of a photographic filmstrip bearing a magnetic recording layer by means of a magnetic record/reproduce head array into parallel data tracks in said magnetic recording layer extending lengthwise of said filmstrip and arranged across said image frame, the apparatus comprising:

means for recording or reproducing a first data sub-set associated with an image frame in or from a first sub-set of parallel data tracks on said magnetic layer as the filmstrip is transported past said magnetic record/reproduce head array; and means for recording or reproducing a second data sub-set associated with said image frame in or from a second sub-set of parallel data tracks interleaved with said first set of parallel data tracks on said magnetic layer as the film is transported past said magnetic record/reproduce head array.

15. Apparatus for recording n/m sub-sets of a photographic data set in relation to a photographic image frame into like n/m interleaved sub-sets of m or fewer data tracks in a magnetic recording layer on a photographic filmstrip comprising:

at least one set of m individual, spaced apart recording heads in a head array positioned to extend laterally across the width of said photographic filmstrip;

means for transporting said filmstrip transversely with respect to said m recording heads and through a photographic image frame gate in a transport direction;

first means for energizing said m recording heads and recording a first sub-set of said photographic data set associated with an image frame in a first sub-set of m data tracks on the filmstrip magnetic layer across the image frame area thereof as said filmstrip is transported in said transport direction; and second means for energizing said m recording heads and recording one or more subsequent sub-sets of said photographic data set associated with said image frame in a one or more further sub-sets of m data tracks on the filmstrip magnetic layer across the image frame area thereof as said filmstrip is transported in said transport direction with respect to said m recording heads such that said subsequent sub-sets of m data tracks are recorded in parallel and interleaved with respect to said first and each preceding sub-set of m data tracks across said image frame area of said filmstrip.

16. The apparatus of claim 15 further comprising:

means for shifting the relative transverse positions of said m recording heads and said filmstrip after the recording of each sub-sets of m data tracks whereby said m recording heads are positioned into alignment with a further sub-set of m data tracks interleaved with respect to previously recorded sub-sets of m data tracks.

17. The apparatus of claim 16 wherein said transporting means further comprises:

means for transporting said filmstrip in a first direction while recording said first sub-set of photographic data in said first sub-set of m data tracks and, after shifting the relative transverse positions of said recording heads and said filmstrip such that said m recording heads are positioned into alignment with a second sub-set of m data tracks, transporting said filmstrip in a second direction while recording a second sub-set of photographic data in a second sub-set of m data tracks.

18. The apparatus of claim 17 wherein said transporting means further comprises:

means operable after shifting the relative transverse positions of said m recording heads and said filmstrip such that said m recording heads are positioned into alignment with a third sub-set of m data tracks, for transporting said filmstrip in said first direction while recording a third sub-set of photographic data in said third sub-set of m data tracks transporting means further comprises:

means for transporting said filmstrip in a first direction while recording said first sub-set of photographic data in said first sub-set of m data tracks and, after shifting the relative transverse positions of said recording heads and said filmstrip such that said m recording heads are positioned into alignment with a second sub-set of m data tracks, transporting said filmstrip in a second direction while recording a second sub-set of photographic data in a second sub-set of m data tracks.

19. The apparatus of claim 15 wherein said magnetic recording heads are spaced apart in a head array at a certain pitch and said shifting means further comprises:

means for laterally shifting said magnetic head array with respect to the width of said filmstrip a distance less than the pitch distance between the spaced apart magnetic recording heads such that said m recording heads are positioned into alignment with a further sub-set of m data tracks interleaved with respect to previously recorded sub-sets of m data tracks.

20. The apparatus of claim 19 wherein said transporting means further comprises:

means for transporting said filmstrip in a first direction while recording said first sub-set of photographic data in said first sub-set of m data tracks; and after shifting said head array into alignment with a further sub-set of m interleaved data tracks, means for transporting said filmstrip in a second direction while recording a further sub-set of photographic data in said further sub-set of m data tracks.

21. The apparatus of claim 19 wherein said transporting means further comprises:

means for transporting said filmstrip in a first direction from a starting position while recording said first sub-set of photographic data in said first sub-set of m data tracks;

means for transporting said filmstrip in said second direction back to said starting position prior to recording a second sub-set of photographic data in a second interleaved sub-set of m data tracks; and means for transporting said filmstrip in said first direction while recording said second sub-set of photographic data in said second interleaved sub-set of m data tracks.

22. Apparatus for recording two sub-sets of a photographic data set related to a photographic image frame of a photographic filmstrip into parallel data tracks in a magnetic recording layer formed on said filmstrip, said parallel data tracks extending lengthwise of said filmstrip and arranged across said image frame, comprising:

a first set of individual, spaced apart magnetic recording heads in a first head array extending laterally across the width of said photographic filmstrip such that said recording heads may record in a first sub-set of spaced apart data tracks in said magnetic recording layer;

a second set of individual, spaced apart magnetic recording heads in a second head array extending laterally across the width of said photographic filmstrip at a predetermined distance from said first set such that said recording heads may record in a second sub-set of spaced apart data tracks extending lengthwise in said magnetic recording layer and interleaved with said first sub-set of spaced apart data tracks;

means for transporting said filmstrip in a transport direction past said first and second head arrays;

first means for energizing said first set of recording heads and recording a first sub-set of said photographic data set associated with an image frame in said first sub-set of data tracks on the filmstrip magnetic layer across the image frame area thereof as said filmstrip is transported in said transport direction; and second means for energizing said second set of recording heads and recording one or more subsequent sub-sets of said photographic data set associated with said image frame in said second sub-set of data tracks on the filmstrip magnetic layer across the image frame area thereof as said filmstrip is transported in said transport direction such that said subsequent sub-sets of data tracks are recorded in parallel and interleaved with respect to said first sub-set of data tracks across said image frame area of said filmstrip.

23. The apparatus of claim 22 wherein:

said first set of individual, spaced apart recording heads are positioned in a first array extending laterally across the width of said photographic filmstrip on a first side of a photographic image frame gate; and said second set of individual, spaced apart recording heads are positioned in a second array extending laterally across the width of said photographic filmstrip on a second side of a photographic image frame gate.

24. The apparatus of claim 23 wherein said transporting means further comprises:

means for first transporting a filmstrip image frame in a reverse direction out of said photographic image frame gate past said first set of recording heads after an exposure of the image frame has been made in said exposure gate;

means for halting said transporting of said filmstrip in said reverse direction;

means for secondly transporting said filmstrip in a forward direction back past said first set of recording heads, through said photographic image frame gate, and past said first said second set of recording heads; and means for halting said transporting of said filmstrip in said forward direction when a next filmstrip image frame area to be exposed is located in said exposure gate.

25. The apparatus of claim 24 wherein:

said first energizing means is operable to energize said first set of recording heads and record a first sub-set of said photographic data set associated with an image frame in said first sub-set of data tracks on the filmstrip magnetic layer across the image frame area thereof as said filmstrip is transported in said rewind direction past said first set of recording heads; and said second energizing means is operable to energize said second set of recording heads and record one or more subsequent sub-sets of said photographic data set associated with said image frame in said second sub-set of data tracks on the filmstrip magnetic layer across the image frame area thereof as said filmstrip is transported in said forward direction past said second set of recording heads such that said subsequent sub-sets of data tracks are recorded in parallel and interleaved with respect to said first sub-set of data tracks across said image frame area of said filmstrip.

26. The apparatus of claim 24 wherein:

said first energizing means is operable to energize said first set of recording heads and record a first sub-set of said photographic data set associated with an image frame in said first sub-set of data tracks on the filmstrip magnetic layer across the image frame area thereof as said filmstrip is transported in said forward direction past said first set of recording heads and back into said photographic image frame gate; and said second energizing means is operable to energize said second set of recording heads and record one or more subsequent sub-sets of said photographic data set associated with said image frame in said second sub-set of data tracks on the filmstrip magnetic layer across the image frame area thereof as said filmstrip is transported in said forward direction past said second set of recording heads such that said subsequent sub-sets of data tracks are recorded in parallel and interleaved with respect to said first sub-set of data tracks across said image frame area of said filmstrip.

27. Apparatus for reproducing n/m sub-sets of a photographic data set in relation to a photographic image frame from n/m interleaved sub-sets of m or fewer data tracks in a magnetic recording layer on a photographic filmstrip comprising:

at least one set of m individual, spaced apart magnetic heads in a magnetic head array positioned to extend laterally across the width of said photographic filmstrip;

means for selectively transporting said filmstrip transversely with respect to said m magnetic heads in a forward transport direction;

first means for enabling said m magnetic heads for reproducing a first sub-set of said photographic data set in a first sub-set of m data tracks on the filmstrip magnetic layer extending across the image frame area thereof as said filmstrip is transported in said forward transport direction;

means for selectively transporting said filmstrip transversely with respect to said m magnetic heads in a reverse transport direction;

means for shifting the relative lateral positions of said m recording heads of said magnetic head array and said filmstrip after the reproduction of photographic data from each sub-set of m data tracks whereby said m recording heads are positioned into alignment with a further sub-set of m data tracks interleaved with respect to previously reproduced sub-sets of m data tracks;

means for selectively transporting said filmstrip transversely with respect to said m magnetic heads in said forward transport direction; and second means for enabling said m magnetic heads for reproducing a second sub-set of said photographic data set in a second sub-set of m data tracks on the filmstrip magnetic layer extending across the image frame area thereof as said filmstrip is transported in said forward transport direction.

28. A method of reproducing n/m sub-sets of a photographic data set in relation to a photographic image frame from n/m interleaved sub-sets of m or fewer data tracks in a magnetic recording layer on a photographic filmstrip employing at least one set of m individual, spaced apart magnetic heads in a magnetic head array positioned to extend laterally across the width of said photographic filmstrip, comprising the steps of;

selectively transporting said filmstrip transversely with respect to said m magnetic heads in a forward transport direction;

enabling said m magnetic heads for reproducing a first sub-set of said photographic data set in a first sub-set of m data tracks on the filmstrip magnetic layer extending across the image frame area thereof as said filmstrip is transported in said forward transport direction;

selectively transporting said filmstrip transversely with respect to said m magnetic heads in a reverse transport direction;

shifting the relative lateral positions of said m recording heads of said magnetic head array and said filmstrip after the reproduction of photographic data from each sub-set of m data tracks whereby said m recording heads are positioned into alignment with a further sub-set of m data tracks interleaved with respect to previously reproduced sub-sets of m data tracks;

selectively transporting said filmstrip transversely with respect to said m magnetic heads in said forward transport direction; and enabling said m magnetic heads for reproducing a second sub-set of said photographic data set in a second sub-set of m data tracks on the filmstrip magnetic layer extending across the image frame area thereof as said filmstrip is transported in said forward transport direction.

29. Apparatus for reproducing two sub-sets of a photographic data set related to a photographic image frame of a photographic filmstrip recorded into parallel data tracks in a magnetic recording layer formed on said filmstrip, said data tracks extending lengthwise of said filmstrip and arranged across said image frame, comprising:

a first set of individual, spaced apart magnetic reproduce heads in a first head array extending laterally across the width of said photographic filmstrip such that said magnetic heads are aligned with a first sub-set of spaced apart data tracks extending lengthwise in said magnetic recording layer;

a second set of individual, spaced apart magnetic reproduce heads in a second head array extending laterally across the width of said photographic filmstrip at a predetermined distance from said first set such that said magnetic heads are aligned with a second sub-set of spaced apart data tracks extending lengthwise in said magnetic recording layer and interleaved with said first sub-set of spaced apart data tracks;

means for transporting said filmstrip in a transport direction past said first and second head arrays;

first means for enabling said first head array for reproducing a first sub-set of said photographic data set recorded in said first sub-set of data tracks on the filmstrip magnetic layer as said filmstrip is transported in said transport direction; and second means for enabling said second head array for reproducing a second sub-set of said photographic data set recorded in said second sub-set of data tracks on the filmstrip magnetic layer as said filmstrip is transported in said transport direction.

30. A method of reproducing two sub-sets of a photographic data set related to a photographic image frame of a photographic filmstrip recorded into parallel data tracks in a magnetic recording layer formed on said filmstrip, said data tracks extending lengthwise of said filmstrip and arranged across said image frame, comprising:

providing a first set of individual, spaced apart magnetic reproduce heads in a first head array extending laterally across the width of said photographic filmstrip such that said magnetic heads are aligned with a first sub-set of spaced apart data tracks extending lengthwise in said magnetic recording layer;

providing a second set of individual, spaced apart magnetic reproduce heads in a second head array extending laterally across the width of said photographic filmstrip at a predetermined distance from said first set such that said magnetic heads are aligned with a second sub-set of spaced apart data tracks extending lengthwise in said magnetic recording layer and interleaved with said first sub-set of spaced apart data tracks;

transporting said filmstrip in a transport direction past said first and second head arrays;

enabling said first head array for reproducing a first sub-set of said photographic data set recorded in said first sub-set of data tracks on the filmstrip magnetic layer as said filmstrip is transported in said transport direction; and enabling said second head array for reproducing a second sub-set of said photographic data set recorded in said second sub-set of data tracks on the filmstrip magnetic layer as said filmstrip is transported in said transport direction.

* * * * *